United States Patent
Sowizral et al.

(10) Patent No.: US 6,437,796 B2
(45) Date of Patent: Aug. 20, 2002

(54) MULTIPLE PROCESSOR VISIBILITY SEARCH SYSTEM AND METHOD

(75) Inventors: Henry A. Sowizral, Bellevue; Karel Zikan, Seattle, both of WA (US); Randall G. Keller, San Carlos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/895,665

(22) Filed: Jun. 29, 2001

Related U.S. Application Data

(63) Continuation-in-part of application No. 09/247,466, filed on Feb. 9, 1999.
(60) Provisional application No. 60/074,868, filed on Feb. 17, 1998, and provisional application No. 60/250,823, filed on Dec. 1, 2000.

(51) Int. Cl.[7] ................................................. G09G 5/00
(52) U.S. Cl. ....................................... 345/622; 345/419
(58) Field of Search ................................ 345/419, 420, 345/421, 428, 620, 622

(56) References Cited

U.S. PATENT DOCUMENTS

| | | | | |
|---|---|---|---|---|
| 5,295,243 A | * | 3/1994 | Robertson et al. | 345/649 |
| 6,137,499 A | * | 10/2000 | Tesler | 345/440 |
| 6,223,145 B1 | * | 4/2001 | Hearst | 703/22 |
| 6,259,451 B1 | * | 7/2001 | Tesler | 345/419 |
| 6,300,965 B1 | * | 10/2001 | Sowizral et al. | 345/622 |

* cited by examiner

Primary Examiner—Mark Zimmerman
Assistant Examiner—Enrique L Santiago
(74) Attorney, Agent, or Firm—Conley, Rose & Tayon; Mark K. Brightwell

(57) ABSTRACT

A system and method for performing visible object determination based upon a dual search of a cone hierarchy and a bound hierarchy performed by multiple processors. Each processor is configured to read a (global and/or local) problem queue to access a bound-cone pair. The bound-cone pair points to a bound in the bound hierarchy and a cone in the cone hierarchy. The processor computes a bound-cone distance between the bound and the cone, and compares the bound-cone distance to a visibility distance associated with the cone. If the bound-cone distance is smaller than the visibility distance, the processor may write two or more refined bound-cone pairs corresponding to a refinement of the original pair to the global or local problem queue. When the processor detects a leaf bound and a leaf cone, it updates a nearest object pointer and the visibility distance associated with the leaf cone.

21 Claims, 13 Drawing Sheets

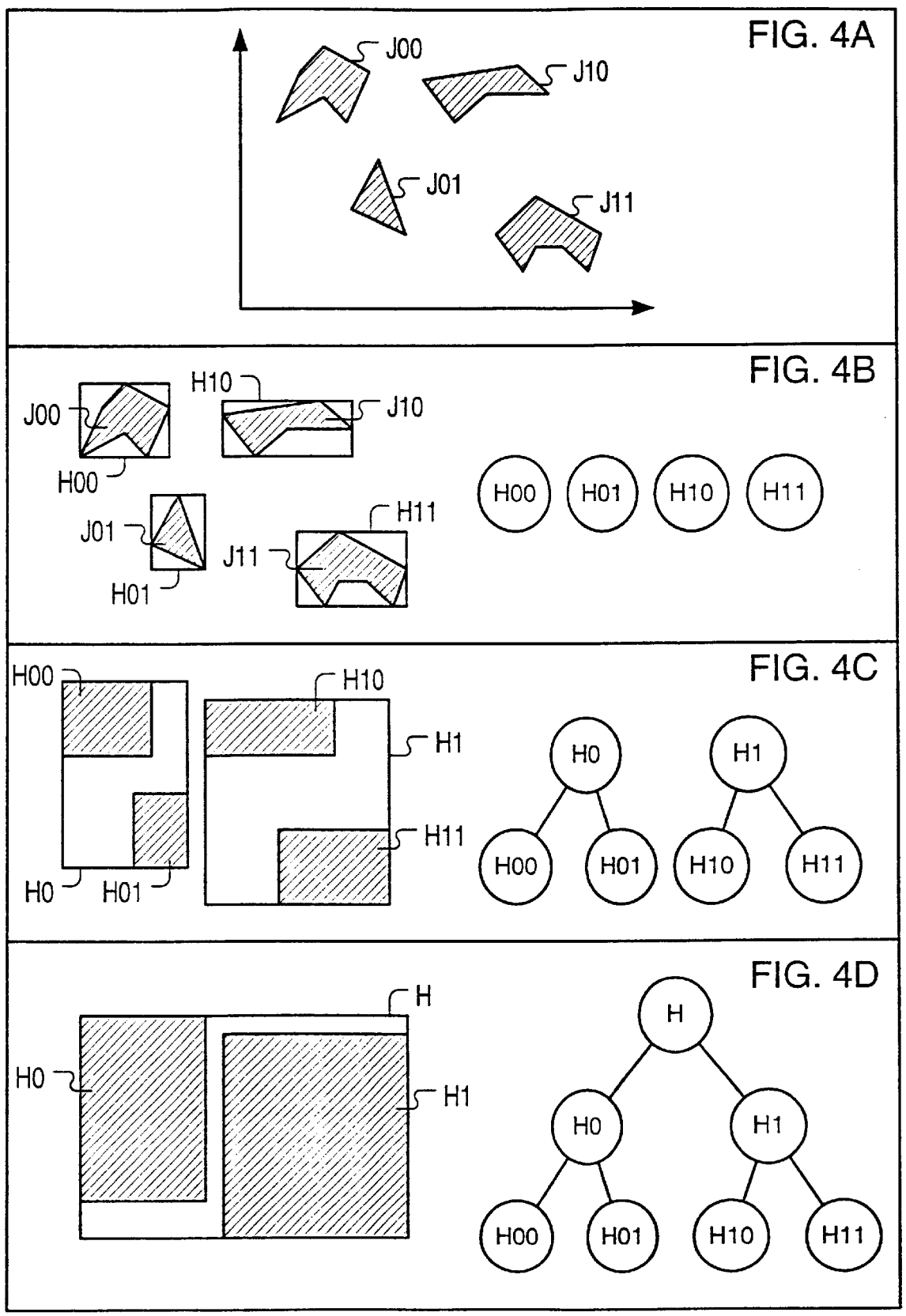

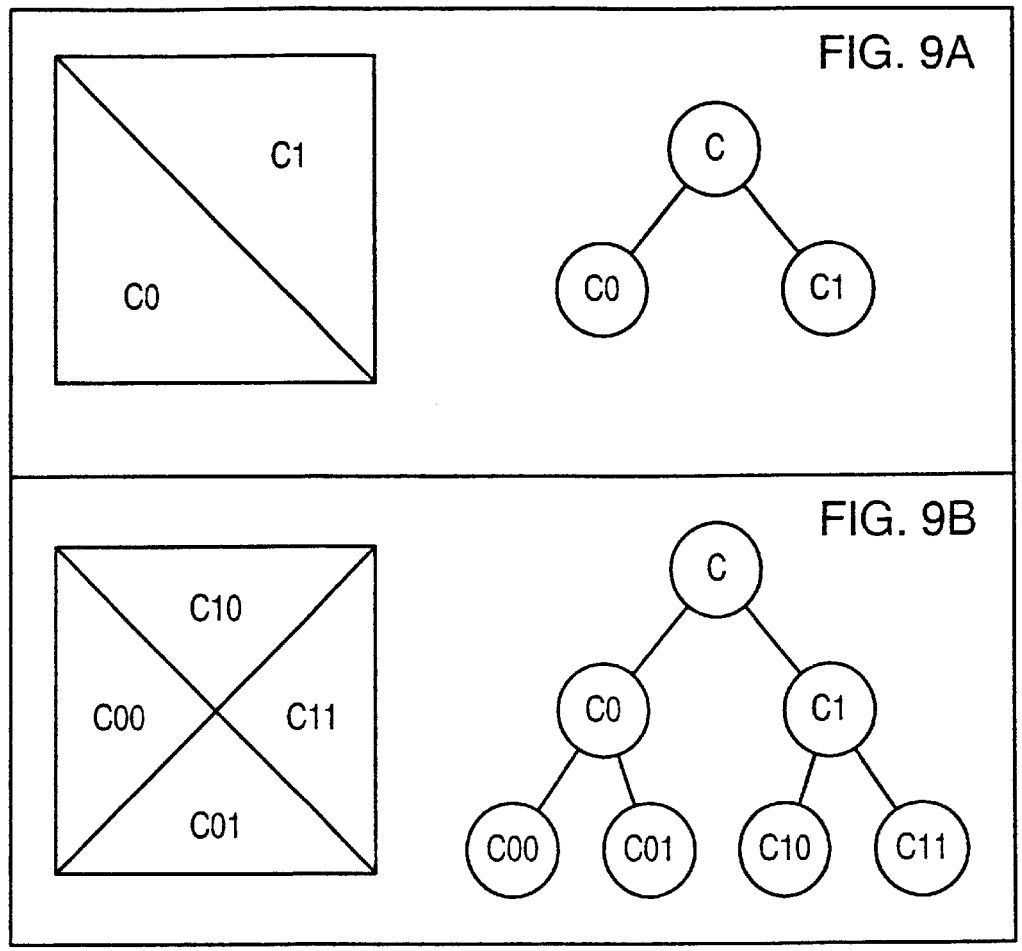
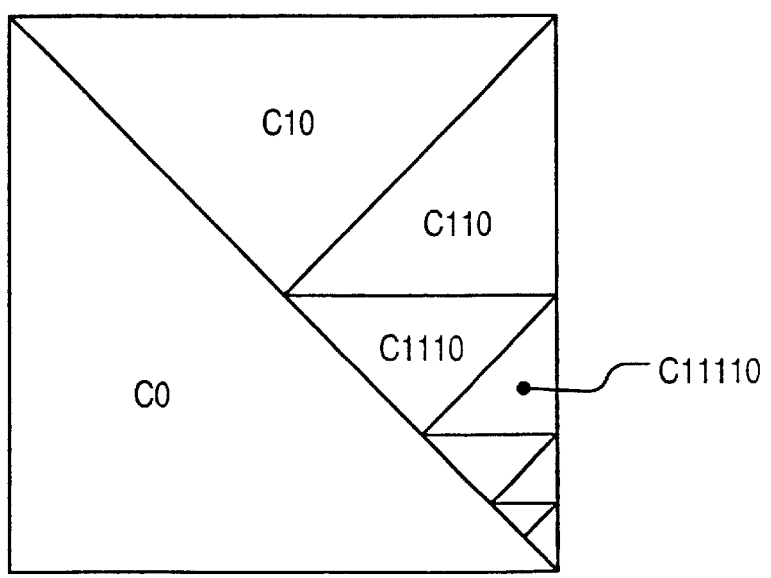
FIG. 9C

MULTIPLE PROCESSOR VISIBILITY SEARCH SYSTEM AND METHOD

CROSS REFERENCES TO RELATED APPLICATIONS

This application claims the benefit of U.S. Provisional Application No. 60/250,823 filed on Dec. 1, 2000 titled "Multiple Processor Visibility Search System and Method".

This application is a continuation-in-part of U.S. patent spplication Ser. No. 09/247,466 filed on Feb. 9, 1999 titled "Visible-Object Determination For Interactive Visualization", which claims the benefit of U.S. Provisional Application No. 60/074,868 filed on Feb. 17, 1998 titled "Visible-Object Determination for Interactive Visualization".

BACKGROUND OF THE INVENTION

1. Field of the Invention

The present invention relates generally to the field of computer graphics, and more particularly, to the problem of determining the set of objects (and portions of objects) visible from a defined viewpoint in a graphics environment.

2. Description of the Related Art

Visualization software has proven to be very useful in evaluating three-dimensional designs long before the physical realization of those designs. In addition, visualization software has shown its cost effectiveness by allowing engineering companies to find design problems early in the design cycle, thus saving them significant amounts of money. Unfortunately, the need to view more and more complex scenes has outpaced the ability of graphics hardware systems to display them at reasonable frame rates. As scene complexity grows, visualization software designers need to carefully use the rendering resource provided by graphic hardware pipelines.

A hardware pipeline wastes rendering bandwidth when it discards rendered triangle work. Rendering bandwidth waste can be decreased by not asking the pipeline to draw triangles that it will discard. Various software methods for reducing pipeline waste have evolved over time. Each technique reduces waste at a different point within the pipeline. As an example, software culling of objects falling outside the view frustum can significantly reduce discards in a pipeline's clipping computation. Similarly, software culling of back-facing triangles can reduce discards in a pipeline's lighting computation.

The z-buffer is the final part of the graphics pipeline that discards work. In essence, the z-buffer retains visible surfaces, and discards those not visible because they are behind another surface (i.e. occluded). As scene complexity increases, especially in walk-through and CAD environments, the number of occluded surfaces rises rapidly and as a result the number of surfaces that the z-buffer discards rises as well. A frame's average depth complexity determines roughly how much work (and thus rendering bandwidth) the z-buffer discards. In a frame with a per-pixel depth complexity of d the pipeline's effectiveness is 1/d. As depth complexity rises, the hardware pipeline thus becomes proportionally less and less effective.

Software occlusion culling has been proposed as an additional tool for improving rendering effectiveness. A visualization program which performs occlusion culling effectively increases the overall rendering bandwidth of the graphics hardware by not asking the hardware pipeline to draw occluded objects. Computing a scene's visible objects is the complementary problem to that of occlusion culling. Rather than removing occluded objects from the set of objects in a scene or frustum-culled scene, a program instead computes which objects are visible and instructs the rendering hardware to draw just those. A simple visualization program can compute the set of visible objects and draw those objects from the current viewpoint, thus allowing the pipeline to focus on removing backfacing polygons and the z-buffer to remove any non-visible surfaces of those objects.

One technique for computing the visible object set uses ray casting as shown in FIG. 1. RealEyes [Sowizral, H. A., Zikan, K., Esposito, C., Janin, A., Mizell, D., "RealEyes: A System for Visualizing Very Large Physical Structures", SIGGRAPH '94, Visual Proceedings, 1994, p. 228], a system that implemented the ray casting technique, was demonstrated in SIGGRAPH 1994's BOOM room. At interactive rates, visitors could "walk" around the interior of a Boeing 747 or explore the structures comprising Space Station Freedom's lab module.

The intuition for the use of rays in determining visibility relies on the properties of light. The first object encountered along a ray is visible since it alone can reflect light into the viewer's eye. Also, that object interposes itself between the viewer and all succeeding objects along the ray making them not visible. In the discrete world of computer graphics, it is difficult to propagate a continuum of rays. So a discrete subset of rays is invariably used. Of course, this implies that visible objects or segments of objects smaller than the resolution of the ray sample may be missed and not discovered. This is because rays guarantee correct determination of visible objects only up to the density of the ray-sample. FIG. 1 illustrates the ray-based method of visible object detection. Rays that interact with one or more objects are marked with a dot at the point of their first contact with an object. It is this point of first contact that determines the value of the screen pixel corresponding to the ray. Also observe that the object 10 is small enough to be entirely missed by the given ray sample.

Visible-object determination has its roots in visible-surface determination. Foley et al. [Foley, J., van Dam, A., Feiner, S. and Hughes, J. Computer Graphics: Principles and Practice, 2nd ed., Addison-Wesley, Chapter 15, pp.649–718, 1996] classify visible-surface determination approaches into two broad groups: image-precision and object-precision algorithms. Image precision algorithms typically operate at the resolution of the display device and tend to have superior performance computationally. Object precision approaches operate in object space—usually performing object to object comparisons.

A prototypical image-precision visible-surface-determination algorithm casts rays from the viewpoint through the center of each display pixel to determine the nearest visible surface along each ray. The list of applications of visible-surface ray casting (or ray tracing) is long and distinguished. Appel ["Some Techniques for Shading Machine Rendering of Solids", SJCC'68, pp. 37–45, 1968] uses ray casting for shading. Goldstein and Nagel [Mathematical Applications Group, Inc., "3-D Simulated Graphics Offered by Service Bureau," Datamation, 13(1), February 1968, p. 69.; see also Goldstein, R. A. and Nagel, R., "3-D Visual Simulation", Simulation, 16(1), pp.25–31, 1971] use ray casting for boolean set operations. Kay et al. [Kay, D. S. and Greenberg, D., "Transparency for Computer Synthesized Images," SIGGRAPH'79, pp.158–164] and Whitted ["An Improved Illumination Model for Shaded Display", CACM, 23(6), pp.343–349, 1980] use ray tracing for refraction and specular reflection computations. Airey et al. [Airey, J. M., Rohlf, J. H. and Brooks, Jr. F. P., "Towards Image Realism with Interactive Update Rates in Complex Virtual Building Environments", ACM SIGGRAPH Symposium on Interactive 3D Graphics, 24, 2(1990), pp. 41–50] uses ray casting for computing the portion of a model visible from a given cell.

Another approach to visible-surface determination relies on sending beams or cones into a database of surfaces [see Dadoun et al., "Hierarchical approachs to hidden surface intersection testing", Proceeedings of Graphics Interface '82, Toronto, May 1982, 49–56; see also Dadoun et al., "The geometry of beam tracing", In Joseph O'Rourke, ed., Proceeedings of the Symposium on Computational Geometry, pp.55–61, ACM Press, New York, 1985]. Essentially, beams become a replacement for rays. The approach usually results in compact beams decomposing into a set of possibly non-connected cone(s) after interacting with an object.

A variety of spatial subdivision schemes have been used to impose a spatial structure on the objects in a scene. The following four references pertain to spatial subdivision schemes: (a) Glassner, "Space subdivision for fast ray tracing," IEEE CG&A, 4(10):15–22, October 1984; (b) Jevans et al., "Adaptive voxel subdivision for ray tracing," Proceedings Graphics Interface '89, 164–172, June 1989; (c) Kaplan, M. "The use of spatial coherence in ray tracing," in Techniques for Computer Graphics . . . , Rogers, D. and Earnshaw, R. A. (eds), Springer-Verlag, New York, 1987; and (d) Rubin, S. M. and Whitted, T. "A 3-dimensional representation for fast rendering of complex scenes," Computer Graphics, 14(3):110–116, July 1980.

Kay et al. [Kay, T. L. and Kajiya, J. T., "Ray Tracing Complex Scenes", SIGGRAPH 1986, pp. 269–278,1986], concentrating on the computational aspect of ray casting, employed a hierarchy of spatial bounding volumes in conjunction with rays, to determine the visible objects along each ray. Of course, the spatial hierarchy needs to be precomputed. However, once in place, such a hierarchy facilitates a recursive computation for finding objects. If the environment is stationary, the same data-structure facilitates finding the visible object along any ray from any origin.

Teller et al. [Teller, S. and Sequin, C. H., "Visibility Preprocessing for Interactive Walkthroughs," SIGGRAPH '91, pp.61–69] use preprocessing to full advantage in visible-object computation by precomputing cell-to-cell visibility. Their approach is essentially an object precision approach and they report over 6 hours of preprocessing time to calculate 58 Mbytes of visibility information for a 250,000 polygon model on a 50 MIP machine [Teller, S. and Sequin. C. H., "Visibility computations in polyhedral three-dimensional environments," U.C. Berkeley Report No. UCB/CSD 92/680, April 1992].

In a different approach to visibility computation, Greene et al. [Greene, N., Kass, M., and Miller, G., "Hierarchical z-Buffer Visibility," SIGGRAPH '93, pp.231–238] use a variety of hierarchical data structures to help exploit the spatial structure inherent in object space (an octree of objects), the image structure inherent in pixels (a Z pyramid), and the temporal structure inherent in frame-by-frame rendering (a list of previously visible octree nodes). The Z-pyramid permits the rapid culling of large portions of the model by testing for visibility using a rapid scan conversion of the cubes in the octree.

As used herein, the term "octree" refers to a data structure derived from a hierarchical subdivision of a three-dimensional space based on octants. The three-dimensional space may be divided into octants based on three mutually perpendicular partitioning planes. Each octant may be further partitioned into eight sub-octants based on three more partitioning planes. Each sub-octant may be partitioned into eight sub-suboctants, and so forth. Each octant, sub-octant, etc., may be assigned a node in the data structure. For more information concerning octrees, see pages 550–555, 559–560 and 695–698 of Computer Graphics: principles and practice, James D. Foley et al., $2^{nd}$ edition in C, ISBN 0-201-84840-6, T385.C5735, 1996.

The depth complexity of graphical environments continues to increase in response to consumer demand for realism and performance. Thus, the efficiency of an algorithm for visible object determination has a direct impact on the marketability of a visualization system. The computational bandwidth required by the visible object determination algorithm determines the class of processor required for the visualization system, and thereby affects overall system cost. Thus, a system and method for improving the efficiency of visible object determination is greatly desired.

SUMMARY OF THE PRESENT INVENTION

Various embodiments of a system and method for performing visible object determination based upon a dual search of a cone hierarchy and a bound hierarchy are herein disclosed. In one embodiment, the system may comprise a plurality of processors, a display device, a shared memory, and optionally a graphics accelerator. The multiple processors execute a parallel visibility algorithm which operates on a collection of graphical objects to determine a visible subset of the objects from a defined viewpoint. The objects may reside in a three-dimensional space and thus admit the possibility of occluding one another.

The parallel visibility algorithm represents space in terms of a hierarchy of cones emanating from a viewpoint. In one embodiment, the leaf-cones of the cone hierarchy, i.e. the cones at the ultimate level of refinement, subtend an area which corresponds to a fraction of a pixel in screen area. For example, two cones may conveniently fill the area of a pixel. In other embodiments, a leaf-cone may subtend areas which include one or more pixels.

An initial view frustum or neighborhood of the view frustum may be recursively tessellated (i.e. refined) to generate a cone hierarchy. Alternatively, the entire space around the viewpoint may be recursively tessellated to generate the cone hierarchy. In this embodiment, the cone hierarchy is recomputed for changes in the viewpoint and view-direction.

The multiple processors or some subset thereof, or another set of one or more processors, may also generate a hierarchy of bounds from the collection of objects. In particular, the bound hierarchy may be generated by: (a) recursively grouping clusters starting with the objects themselves as order-zero clusters, (b) bounding each object and cluster (of all orders) with a corresponding bound, e.g. a polytope hull, (c) allocating a node in the bound hierarchy for each object and cluster, and (d) organizing the nodes in the bound hierarchy to reflect cluster membership. For example if node A is the parent of node B, the cluster corresponding to node A contains a subcluster (or object) corresponding to node B. Each node stores parameters which characterize the bound of the corresponding cluster or object.

The cone hierarchy and bound hierarchy may be stored in the shared memory. In addition, the shared memory may store a global problem queue. The global problem queue is initially loaded with a collection of bound-cone pairs. Each bound-cone pair points to a bound in the bound hierarchy and a cone in the cone hierarchy.

The multiple processors may couple to the shared memory, and may perform a search of the cone and bound hierarchies to identify one or more nearest objects for a subset of cones (e.g. the leaf cones) in the cone hierarchy. After the multiple processors complete the search of the cone and bound hierarchies, a transmission agent (e.g. the multiple processors, some subset thereof, or another set of one or more processors) may transmit graphics primitives, e.g. triangles, corresponding to the nearest objects of each cone in the subset, to a rendering agent. The rendering agent (e.g. the graphics accelerator, or a software renderer executing on the multiple processors, some subset thereof, or another set of one or more processors) is operable to receive the graphics primitives, to perform rendering computations on the graphics primitives to generate a stream of pixels, and to transmit the pixel stream to the display device.

In some embodiments, each leaf-cone may be assigned a visibility distance value which represents the distance to the closest known object as perceived from within the leaf-cone. Each leaf-cone may also be assigned an object pointer which specifies the closest known object within view of the leaf-cone. Similarly, each non-leaf cone may be assigned a visibility distance value. However, the visibility distance value of a non-leaf cone may be set equal to the maximum of the visibility distance values for its subcone children. This implies that the visibility distance value for each non-leaf cone equals the maximum of the visibility distance values of its leaf-cone descendents.

In one embodiment, each of the plurality of processors is operable to: (a) read a bound-cone pair (H,C) from the global work queue, (b) compute the distance between the bound H and the cone C, (c) to compare the bound-cone distance to a visibility distance associated with the cone C, (d) to write two or more dependent bound-cone pairs to the global problem queue if the bound-cone distance is smaller than the visibility distance of the cone C. The two or more dependent bound-cone pairs may be pairs generated from bound H and the subcones of cone C, or pairs generated from cone C and subbounds of bound H.

Furthermore, when the processor detects that the hull H is a leaf bound of the bound hierarchy and the cone C is a leaf cone of the cone hierarchy, the processor may update the visibility information for the leaf cone, i.e. may set the visibility distance value for cone C equal to the cone-hull distance computed in (b) above, and may set the nearest object pointer associated with cone C equal to a pointer associated with hull H.

In one alternative embodiment, each processor may couple to a local memory containing a local problem queue. Each processor may read and write bound-cone pairs from/to its local problem queue, and access the global problem queue to read initial bound-cone pairs.

In another alternative embodiment, a collection of cones may be selected from the cone hierarchy, i.e. a collection of non-overlapping cones which fill the space of the root cone (i.e. top level cone). The cones of the collection may be distributed among the multiple processors. Each of the multiple processors may perform a search of its assigned cones (i.e. the subtrees of the cone hierarchy defined by these assigned cones) against the hull tree.

BRIEF DESCRIPTION OF THE FIGURES

The foregoing, as well as other objects, features, and advantages of this invention may be more completely understood by reference to the following detailed description when read together with the accompanying drawings in which:

FIG. 4A illustrates a collection of objects in a graphics environment;

FIG. 4B illustrates a first step in one embodiment of a method for forming a hull hierarchy, i.e. the step of bounding objects with containing hulls and allocating hull nodes for the containing hulls;

FIG. 4C illustrates one embodiment of the process of grouping together hulls to form higher order hulls, and allocating nodes in the hull hierarchy which correspond to the higher order hulls;

FIG. 4D illustrates a final stage in the recursive grouping process wherein all objects are contained in a universal containing hull which corresponds to the root node of the hull hierarchy;

FIGS. 9A–9C illustrate the formation of a cone hierarchy based on repeated subdivision of an initial cone with rectangular cross-section;

Figure 1:
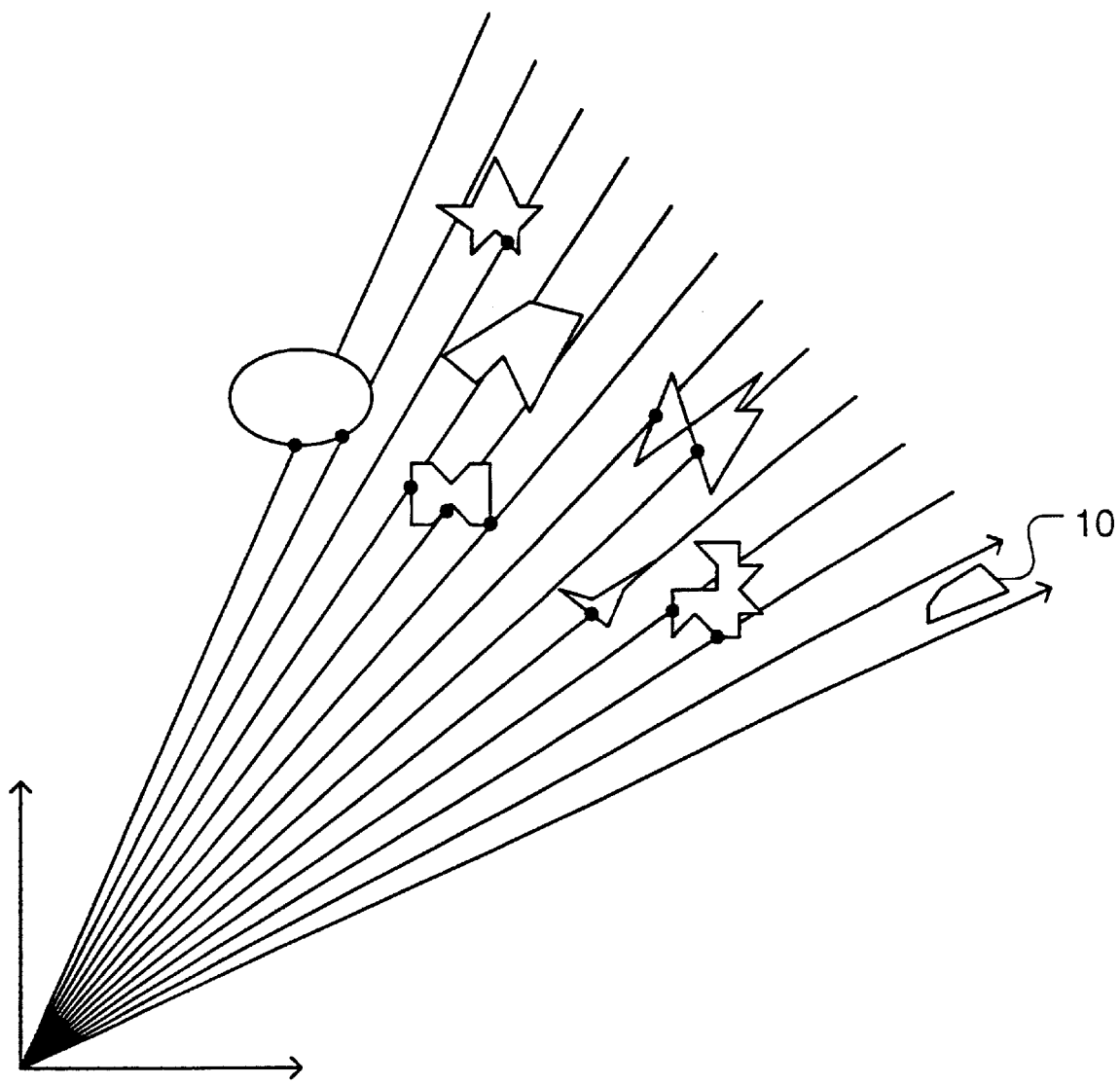
FIG. 1 illustrates the ray-based method of visible object detection according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims. Please note that the section headings used herein are for organizational purposes only and are not meant to limit the description or claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF SEVERAL EMBODIMENTS

Figure 2A:
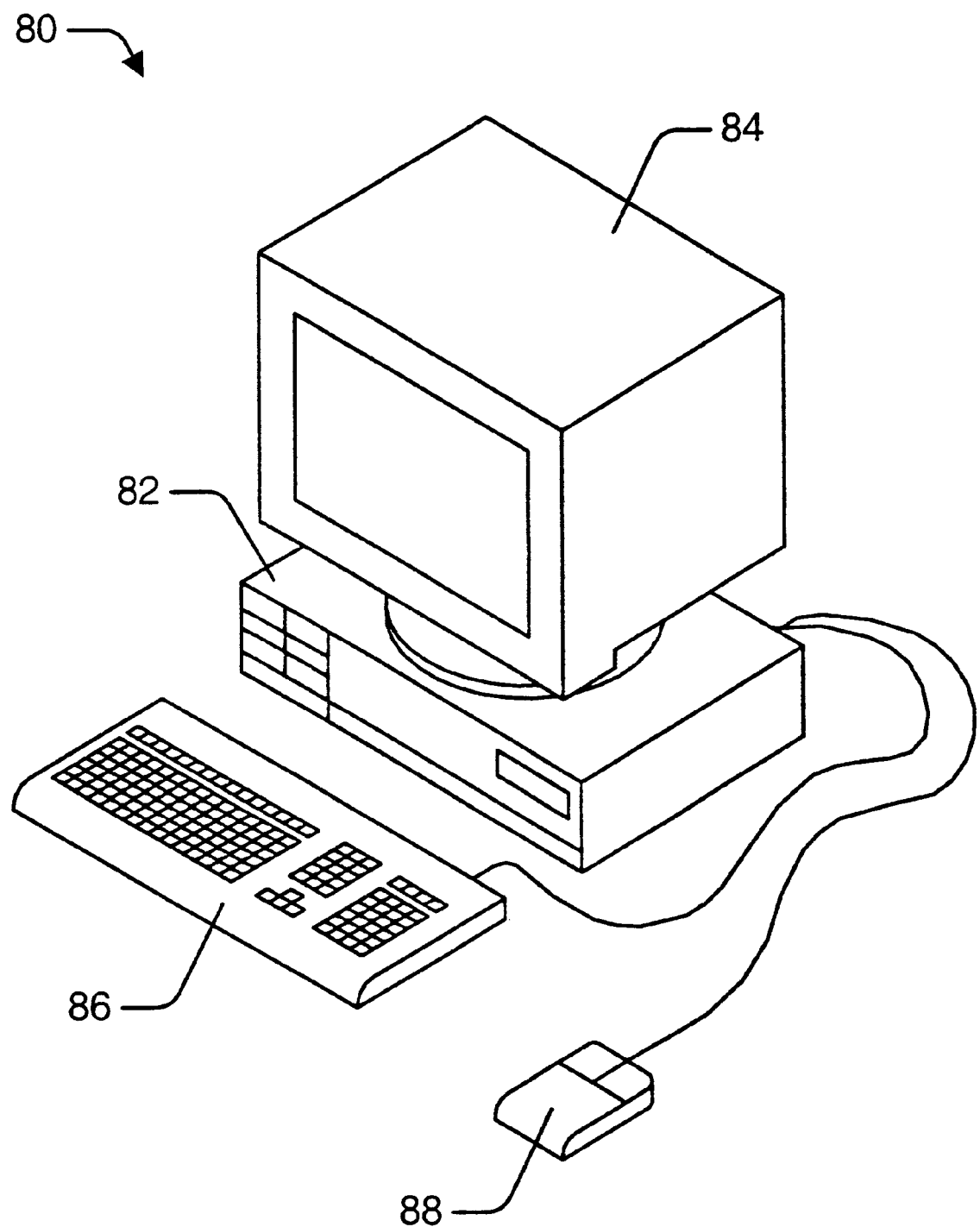
FIG. 2A illustrates one embodiment of a graphical computing system for performing visible object determination.

FIG. 2A presents one embodiment of a graphical computing system 80 for performing visible object determination. Graphical computing system 80 may include a system unit 82, and a display device 84 coupled to the system unit 82. The display device 84 may be realized by any of various types of video monitors or graphical displays. Graphics computer system 80 may include one or more input devices such as a keyboard 86, a mouse 88, a trackball, a digitizing pad, a joystick, etc.

Figure 2B:
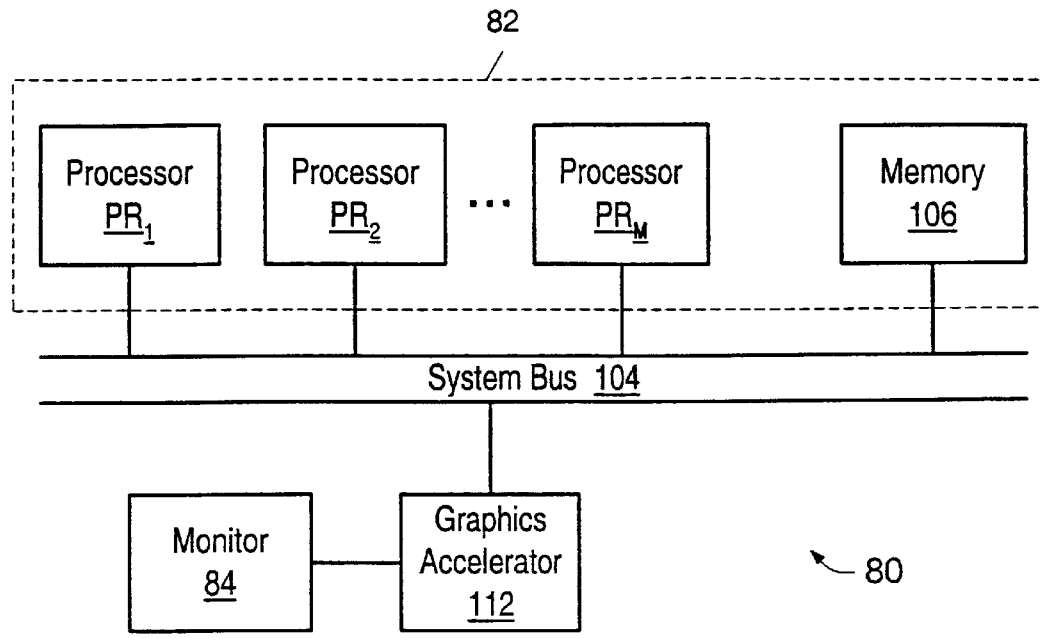
FIG. 2B is a block diagram illustrating one embodiment of the graphical computing system 80.

FIG. 2B is a block diagram illustrating one embodiment of graphical computing system 80. Graphical computing system 80 may include a plurality of processors $PR_1$ through $PR_M$ and a shared memory 106 coupled to a high-speed system bus 104. Graphical computing system 80 may also include a graphics accelerator 112 coupled to system bus 104 and display device 84.

Each processor $PR_1$ may couple to a dedicated local memory (not shown) for storing local code and/or local data. (The notation $PR_1$ refers to an arbitrary one of the processors $PR_1$ through $PR_M$.) The shared memory 106 may include any of various types of memory subsystems including random access memory, read only memory, and/or mass storage devices. Processors $PR_1$ through $PR_M$ operate on a set of objects to determine a subset of the objects which are visible from a particular viewpoint in a three-dimensional scene. Each object in the original set may comprise a collection of graphics primitives (e.g. triangles). In one embodiment, objects may be described in terms of a system of equations and/or geometric constraints, e.g. polynomial equations. In this case, the visible objects may need to be decomposed (i.e. partitioned) into graphics primitives (e.g. tessellated into triangles) prior to pixel rendering and display. The object decomposition may be performed by processors $PR_1$ through $PR_M$, some subset thereof, and/or by a second set of one or more processors (not shown).

Graphics primitives (e.g. triangles) corresponding to the visible objects may be transmitted to graphics accelerator 112 for rendering and display on display device 84. Since graphics accelerator 112 operates on primitives corresponding to the visible objects, a higher percentage of rendered pixels (or supersamples) survive the z-comparison than if the graphics accelerator 112 were supplied with primitives corresponding to the full object set. In other words, the rendering hardware in graphics accelerator 112 may operate with increased efficiency.

In one alternative embodiment, processors $PR_1$ through $PR_M$, or some subset thereof, and/or another set of one or more processors (not shown) may perform pixel rendering computations on the graphics primitives corresponding to the visible objects, and may generate a stream of pixels which are transmitted to display device 84 for image display. In this alternative embodiment, graphics accelerator 112 may not be included in graphics computing system 80.

In one embodiment, graphics accelerator 112 comprises a plurality of graphics processors, and these graphics processors may perform the visible object determination instead of processors $PR_1$ through $PR_M$. In this embodiment, graphics accelerator 112 may receive a set of objects (or pointers to the objects) in a 3D scene. The graphics processors may operate on the set of objects to determine the subset of visible objects with respect to a current viewpoint in the 3D scene. In another embodiment, processors $PR_1$ through $PR_M$ and graphics processor in the graphics accelerator may cooperate to determine the set of visible objects.

As mentioned above, 3-D graphics accelerator 112 may couple to system bus 104, and display device 84 may couple to graphics accelerator 112. 3-D graphics accelerator 112 may be a specialized graphics rendering subsystem which is designed to off-load the 3-D rendering functions from the host system 82, thus providing improved system performance. It is assumed that various other peripheral devices, or other buses, may be connected to system bus 104, as is well known in the art. If 3D accelerator 112 is not included in graphical computing system 80, display device 84 may couple directly to system bus 104.

Processor devices (e.g. processors $PR_1$ through $PR_M$) coupled to system bus 104 may transfer information to and from graphics accelerator 112 according to a programmed input/output (I/O) protocol over the system bus 104. In one embodiment, graphics accelerator 112 may access system memory 106 according to a direct memory access (DMA) protocol or through intelligent bus mastering. In another embodiment, graphics accelerator 112 may couple to system memory 106 through an Advanced Graphics Port connection.

Processors $PR_1$ through $PR_M$ may operate under the control of visualization software stored in shared memory 106 and/or the local memories of the individual processors.

Figure 3:
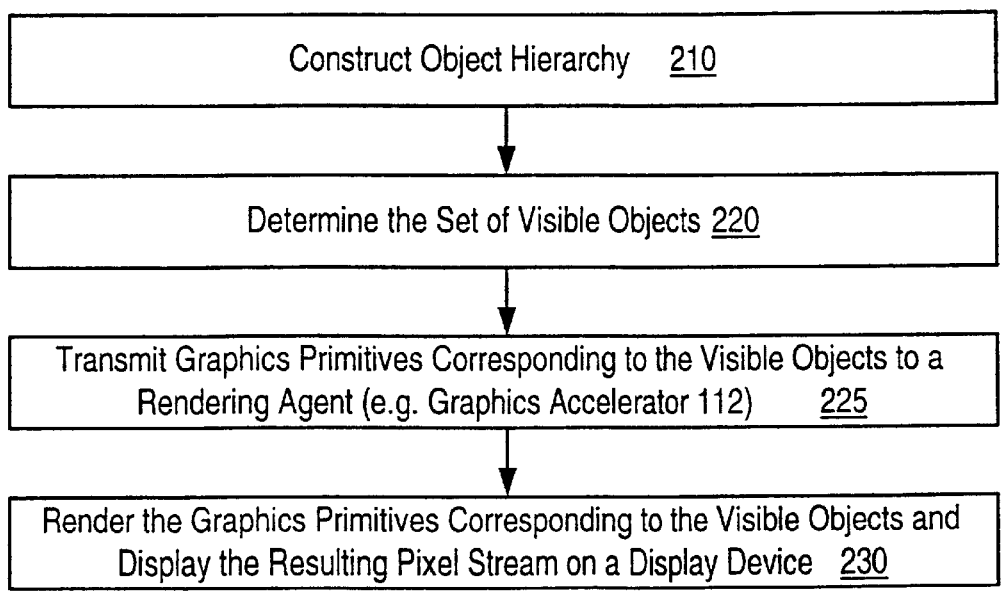
FIG. 3 is a flowchart for processing operations performed in one embodiment of graphical computing system 80.

FIG. 3 is a flowchart for one embodiment of the processing performed by graphics computing system 80 in response to the visualization software. In an initial step 210, the graphics computing system 80 may receive a plurality of objects and construct an object hierarchy from the plurality of objects. (The object hierarchy construction is discussed in more detail below). It is noted that the object hierarchy may have been precomputed, in which case step 210 may be skipped.

In step 220, graphical computing system 80 may discover the set of visible objects in the scene with respect to a current viewpoint. In the preferred embodiment, graphical computing system 80 may be configured to compute visibility for three-dimensional objects from a view point in a three-dimensional coordinate space. However, the methodologies herein described naturally generalize to spaces of arbitrary dimension.

In one embodiment of graphical computing system 80, the viewpoint and view direction in the graphical environment may be changed in response to user input. For example, by manipulating mouse 88, depressing keys on keyboard 86, manipulating a joystick or game control pad, the user may cause the viewpoint and/or view direction to change. Thus, graphical computing system 80 may recompute the set of visible objects whenever the viewpoint and/or the view orientation changes. Furthermore, it is quite often the case that objects may move within the 3D scene. Thus, graphical computing system 80 may recomputed the set of visible objects when the objects in the scene move.

In step 225, graphics computing system 80 may transmit graphics primitives (e.g. triangles) corresponding to the visible objects to a rendering agent for pixel rendering.

In step 230, the rendering agent may perform rendering computations on the graphics primitives to generate a stream of pixels. In one embodiment, the rendering agent may be graphics accelerator 112. In another embodiment, the rendering agent may be a software renderer running on one or more processors (e.g. processors $PR_1$ through $PR_M$ or some subset thereof) configured within graphical computing system 80.

In step 230, the rendering agent may transmit the pixel stream to display device 84 for image display.

Visible object determination step 220 may be performed repeatedly as the viewpoint and/or view direction (i.e. orientation) changes, and/or as the objects themselves evolve in time.

In some embodiments, objects may be modeled as opaque convex polytopes. A three-dimensional solid is said to be convex if any two points in the solid (or on the surface of the solid) may be connected with a line segment which resides entirely within the solid. Thus a solid cube is convex, while a donut (i.e. solid torus) is not. A polytope is an object with planar sides (e.g. cube, tetrahedron, etc.). The methodologies described herein for opaque objects naturally extend to transparent or semi-transparent objects by not allowing such objects to terminate a cone computation. Although not all objects are convex, every object can be approximated as a union of convex polytopes. It is helpful to note that the visible-object-set computation does not require an exact computation, but rather a conservative one. In other words, it is permissible to estimate a superset of the set of visible objects.

Constructing the Object Hierarchy

Initially, the objects in a scene may be organized into a hierarchy that groups objects spatially. An octree is one possibility for generating the object hierarchy. However, in the preferred embodiment, a clustering algorithm is used which groups nearby objects then recursively clusters pairs of groups into larger containing spaces. The clustering algorithm employs a simple distance measure and threshold operation to achieve the object clustering. FIGS. 4A–4D illustrate one embodiment of a clustering process for a collection of four objects J00 through J11. The objects are indexed in a fashion which anticipates their ultimate position in a binary tree of object groups. The objects are depicted as polygons situated in a plane (see FIG. 4A). However, the reader may imagine these objects as arbitrary three-dimensional objects. In one embodiment, the objects are three-dimensional polytopes.

Each object may be bounded, i.e. enclosed, by a corresponding bounding surface referred to herein as a bound. In the preferred embodiment, the bound for each object is a polytope hull (i.e. a hull having planar faces) as shown in FIG. 4B. The hulls H00 through H11 are given labels which are consistent with the objects they bound. For example, hull H00 bounds object J00. The hulls are illustrated as rectangles with sides parallel to a pair of coordinate axes. These hulls are intended to represent rectangular boxes (parallelepipeds) in three dimensions whose sides are normal to a fixed set of coordinate axes. For each hull a corresponding node data structure is generated. The node stores parameters which characterize the corresponding hull.

Figure 5A:
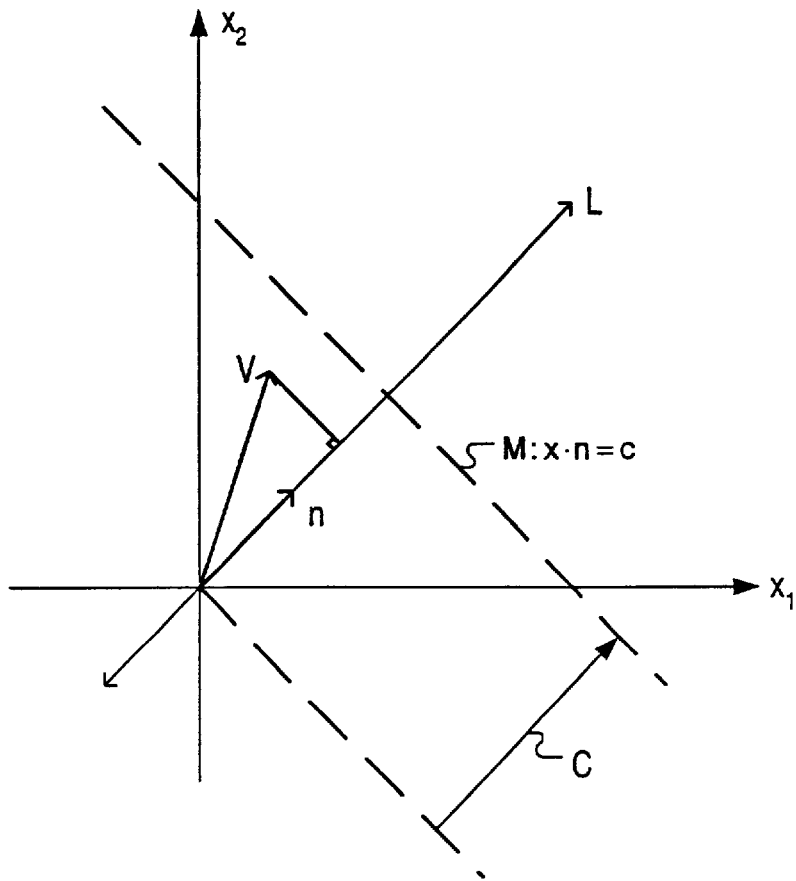
FIG. 5A illustrates the mathematical expressions which describe lines and half-planes in two dimensional space.

Since a hull has a surface which is comprised of a finite number of planar components, the description of a hull is intimately connected to the description of a plane in three-space. In FIG. 5A, a two dimensional example is given from which the equation of an arbitrary plane may be generalized. A unit vector n [any vector suffices but a vector of length one is convenient for discussion] defines a line L through the origin of the two dimensional space. By taking the dot product v·n of a vector v with the unit vector n, one obtains the length of the projection of vector v in the direction defined by unit vector n. Thus, given a real constant c, it follows that the equation x·n=c, where x is a vector variable, defines a line M perpendicular to line L and situated at a distance c from the origin along line L. In the context of three-dimensional space, this same equation defines a plane perpendicular to the line L, again displaced distance c from the origin along line L. Observe that the constant c may be negative, in which case the line (or plane) M is displaced from the origin at distance |c| along line L in the direction opposite to unit vector n.

The line x·n=c divides the plane into two half-planes. By replacing the equality in the above equation with an inequality, one obtains the description of one of these half-planes. The equality x·n<c defines the half-plane which contains the negative infinity end of line L. [The unit vector n defines the positive direction of line L.] In three dimensions, the plane x·n=c divides the three-dimensional space into two half-spaces. The inequality x·n<c defines the half-space which contains the negative infinity end of line L.

Figure 5B:
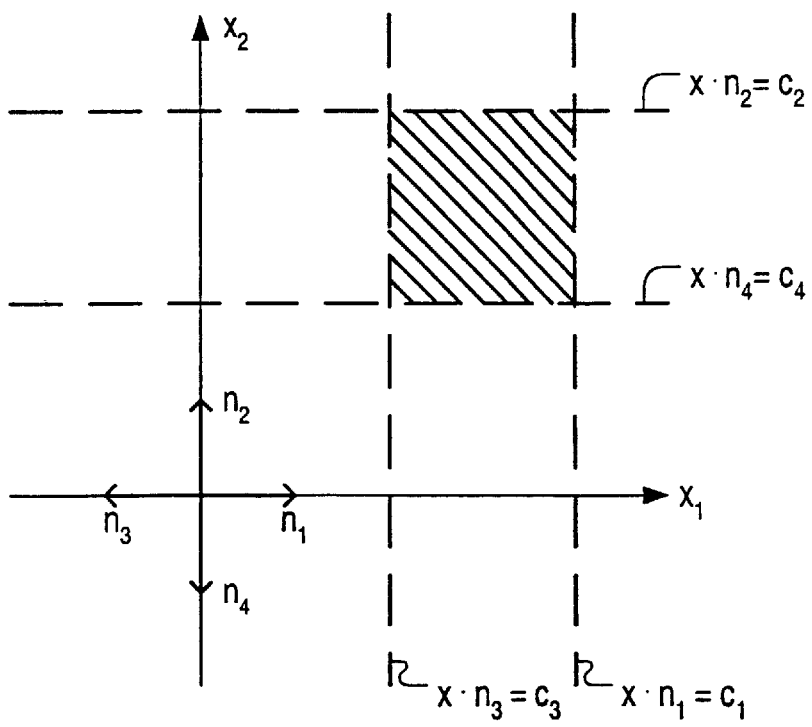
FIG. 5B illustrates the description of a rectangular region as the intersection of four half-planes in a two dimensional space.

FIG. 5B shows how a rectangular region may be defined as the intersection of four half-planes. Given four normal vectors $n_1$, through $n_4$, and four corresponding constants $c_1$ through $c_4$, a rectangular region is defined as the set of points which simultaneously satisfy the set of inequalities $x \cdot n_i < c_i$, where i ranges from one to four. This system of inequalities may be summarized by the matrix-vector expression N·x<c, where the rows of matrix N are the normal vectors $n_1$ through $n_4$, and the components of vector c are the corresponding constants $c_1$ through $c_4$. If the normal vectors are chosen so as to lie in the positive and negative axial directions (as shown in FIG. 5B), the resulting rectangular region has sides parallel to the axes. It is noted that the rectangular hulls H00 through H11 shown in FIG. 4B all use a common set of normal vectors. Thus, each hull is characterized by a unique c vector.

In three-dimensional space, a rectangular box may be analogously defined as the intersection of six half-spaces. Given six normal vectors $n_1$ through $n_6$, oriented in each of the three positive and three negative axial directions, and six corresponding constants $c_1$ through $c_6$, the simultaneous solution of the inequalities $x \cdot n_i < c_i$, where i runs from one to six, defines a rectangular box with sides parallel to the coordinate planes. Thus, a rectangular box may be compactly represented with the same matrix-vector expression Nx<c, where matrix N now has six rows for the six normal vectors, and vector c has six elements for the six corresponding constants.

To construct an object hierarchy, object hulls H00 through H11 are paired together as shown in FIG. 4C. Each pair of object hulls is bounded by a containing hull. For example, hulls H00 and H01 are paired together and bounded by containing hull H0. Containing-hull H0 contains the two component hulls H00 and H01. Likewise, object hulls H10 and H11 are paired together and bounded by containing-hull H1. In addition, two parent nodes are generated in the object hierarchy, one for each of the containing-hulls H0 and H1. For simplicity, the parent nodes are commonly labeled as their corresponding containing-hulls. Thus, parent node H0 points to its children nodes H00 and H01, while parent node H1 points to its children nodes H10 and H11. Each parent node contains the characterizing c vector for the corresponding containing-hull.

The containing-hulls H0 and H1 may be referred to as first order containing-hulls since they are the result of a first pairing operation on the original object hulls. A second pairing operation is applied to the first-order containing hulls to obtain second-order containing-hulls. Each second-order containing-hull contains two first-order hulls. For each of the second-order containing-hulls a parent node is generated in the object hierarchy. The parent node reflects the same parent-child relationship as the corresponding second-order containing-hull. For example, in FIG. 4D, second-order containing-hull H contains first-order containing-hulls H0 and H1. Thus, parent node H in the object hierarchy points to children nodes H0 and H1. Parent node H stores the characterizing vector c for the containing-hull H. In the example presented in FIGS. 4A–4D, the object hierarchy is complete after two pairing operations since the original object collections contained only four objects.

In general, a succession of pairing operations is performed. At each stage, a higher-order set of containing-hulls and corresponding nodes for the object hierarchy are generated. Each node contains the describing vector c for the corresponding containing-hull. At the end of the process, the object hierarchy comprises a binary tree with a single root node. The root node corresponds to a total containing-hull which contains all sub-hulls of all orders including all the original object-hulls. The object hierarchy, because it comprises a hierarchy of bounding hulls, will also be referred to as the hull hierarchy. In the preferred embodiment, the pairing operations are based on proximity, i.e. objects (and hulls of the same order) are paired based on proximity. Proximity based pairing may result in a more efficient visible object determination algorithm. This tree of containing hulls provides a computationally efficient and hierarchical representation of the entire scene. For instance, when a cone completely misses a node's containing-hull, none of the node's descendents need to be examined.

Bounding hulls (i.e. containing hulls) serve the purpose of simplifying and approximating objects. Any hierarchy of containing hulls works in principle. However, hierarchies of hulls based on a common set of normal vectors are particularly efficient computationally. A collection of hulls based on a common set of normal vectors will be referred to herein as a fixed-direction or commonly-generated collection. As described above, a polytope hull is described by a bounding system of linear inequalities $\{x: Nx \leq c\}$, where the rows of the matrix N are a set of normal vectors, and the elements of the vector c define the distances to move along each of the normal vectors to obtain a corresponding side of the polytope. In a fixed-direction collection of hulls, the normal matrix N is common to all the hulls in the collection, while the vector c is unique for each hull in the collection. The problem of calculating the coefficient vector c for a containing hull given a collection of subhulls is greatly simplified when a common set of normal vectors is used. In addition, the nodes of the hull hierarchy may advantageously consume less memory space since the normal matrix N need not be stored in the nodes. In some embodiments, the hull hierarchy comprises a fixed-direction collection of hulls.

In a first embodiment, six normal vectors oriented in the three positive and three negative axial directions are used to generate a fixed-direction hierarchy of hulls shaped like rectangular boxes with sides parallel to the coordinate planes. These axis-aligned bounding hulls provide a simple representation that has excellent local computational properties. It is easy to transform or compare two axis-aligned hulls. However, the approximation provided by axis-aligned hulls tends to be rather coarse, often proving costly at more global levels.

In a second embodiment, eight normal vectors directed towards the corners of a cube are used to generate a hierarchy of eight-sided hulls. For example, the eight vectors $(\pm 1, \pm 1, \pm 1)$ may be used to generate the eight-sided hulls. The octahedron is a special case of this hull family.

In a third embodiment, fourteen normal vectors, i.e. the six normals which generate the rectangular boxes plus the eight normals which generate the eight-sided boxes, are used to generate a hull hierarchy with fourteen-sided hulls. These fourteen-sided hulls may be described as rectangular boxes with corners shaved off. It is noted that as the number of normal vectors and therefore side increases, the accuracy of the hull's approximation to the underlying object increases.

In a fourth embodiment, twelve more normals are added to the fourteen normals just described to obtain a set of twenty-six normal vectors. The twelve additional normals serve to shave off the twelve edges of the rectangular box in addition to the corners which have already been shaved off. This results in twenty-six sided hulls. For example, the twelve normal vectors $(\pm 1, \pm 1, 0)$, $(\pm 1, 0, \pm 1)$, and $(0, \pm 1, \pm 1)$ may be used as the additional vectors.

In the examples given above, hulls are recursively grouped in pairs to generate a binary tree. However, in other embodiments, hulls are grouped together in groups of size $n_G$, where $n_G$ is larger than two. In one embodiment, the group size may vary from group to group.

Although the above discussion has focused on the use of polytope hulls as bounds for object and clusters, it is noted that any type of bounding surfaces may be used, thereby generating a hierarchy of bounds referred to herein as a bounding hierarchy. Each node of the bounding hierarchy corresponds to an object or cluster and stores parameters which characterize the corresponding bound for that object or cluster. For example, polynomial surfaces such as quadratic surfaces may be used to generate bounds for objects and/or clusters. Spheres and ellipsoids are examples of quadratic surfaces.

Cones in Visible Object Determination

In addition to the bounding hierarchy (e.g. hull hierarchy) discussed above, the visualization software makes use of a hierarchy of spatial cones. An initial cone which may represent the view frustum may be recursively subdivided into a hierarchy of sub-cones. Then a simultaneous double recursion may be performed through the pair of trees (the object tree and cone tree) to rapidly determine the set of visible objects. This cone-based method provides a substantial computational gain over the prior art method based on ray-casting.

Figure 6:
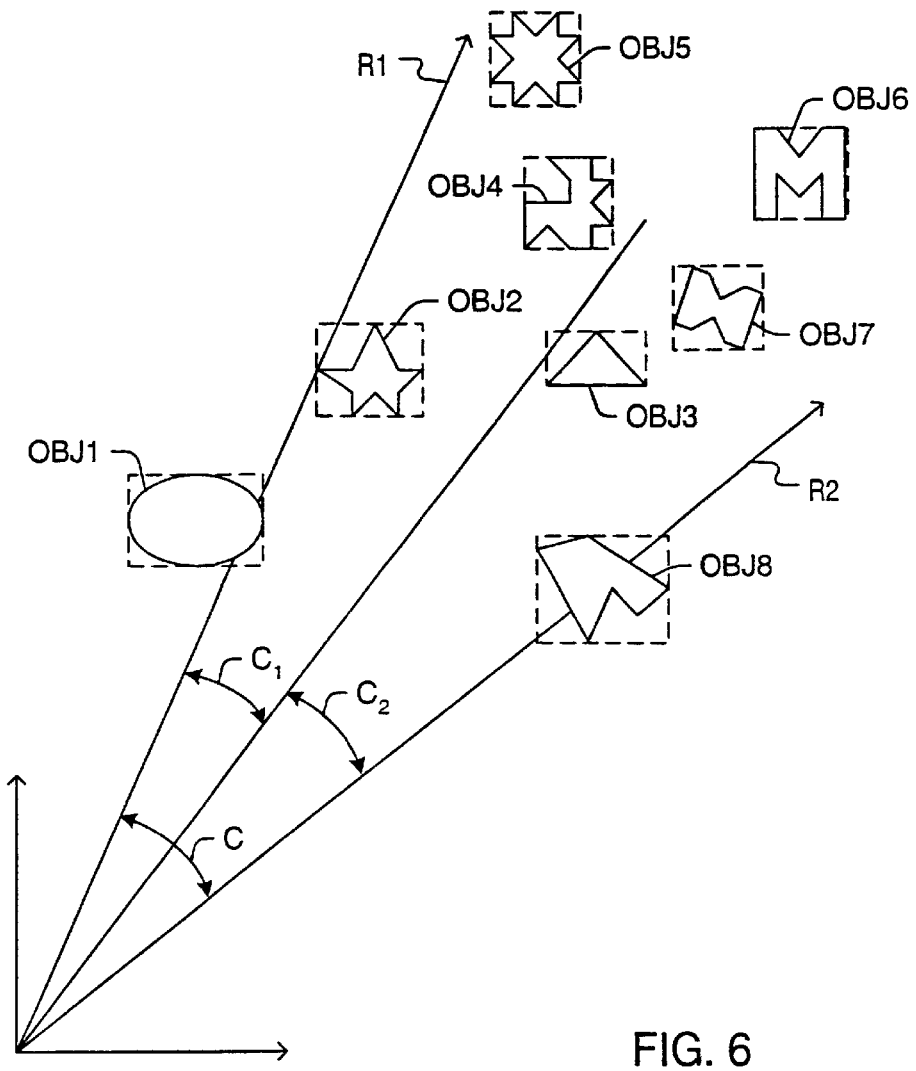
FIG. 6 illustrates a two-dimensional cone C partitioned into a two subcones $C_1$ and $C_2$ which interact with a collection of objects.

FIG. 6 illustrates a two-dimensional cone C in a two-dimensional environment. Cone C is defined by the region interior to the rays R1 and R2 (and inclusive of those rays). Cone C is partitioned into two subcones denoted C0 and C1. The ambient space is populated with a collection of two-dimensional objects OBJ1 through OBJ8. Each of the two-dimensional hulls is bounded by a corresponding rectangular hull. Six of the objects are visible with respect to cone C, i.e. objects OBJ1, OBJ2, OBJ3, OBJ4, OBJ7 and OBJ8. Objects OBJ1, OBJ2 and OBJ4 are visible with respect to subcone C1, and objects OBJ3, OBJ7 and OBJ8 are visible with respect to subcone C2. Object OBJ5 is occluded by objects OBJ2 and OBJ4, and object OBJ6 is occluded by objects OBJ3 and OBJ7.

Polyhedral Cones

Figure 7:
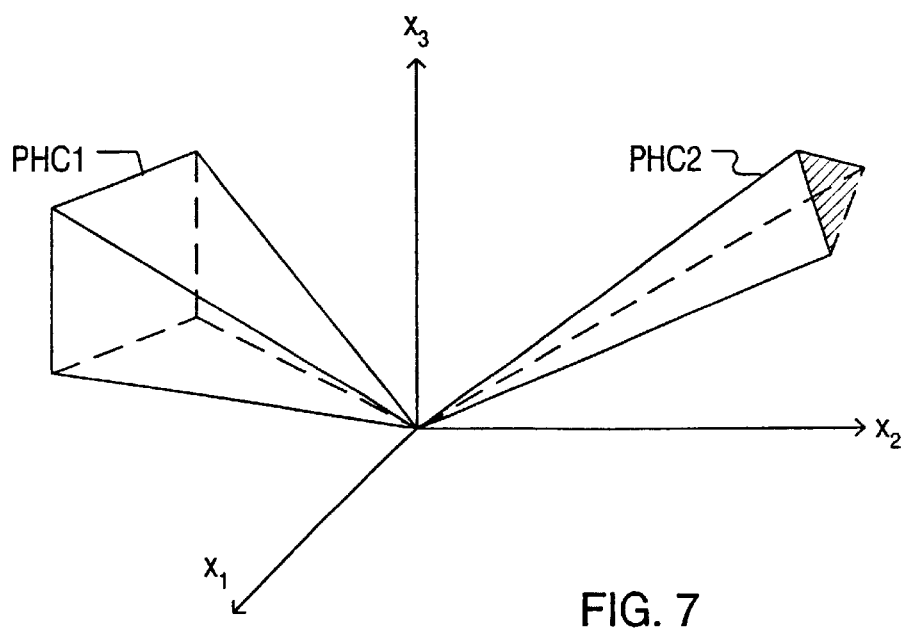
FIG. 7 illustrates polyhedral cones with rectangular and triangular cross-section emanating from the origin of a three-dimensional space.
Figure 8A:
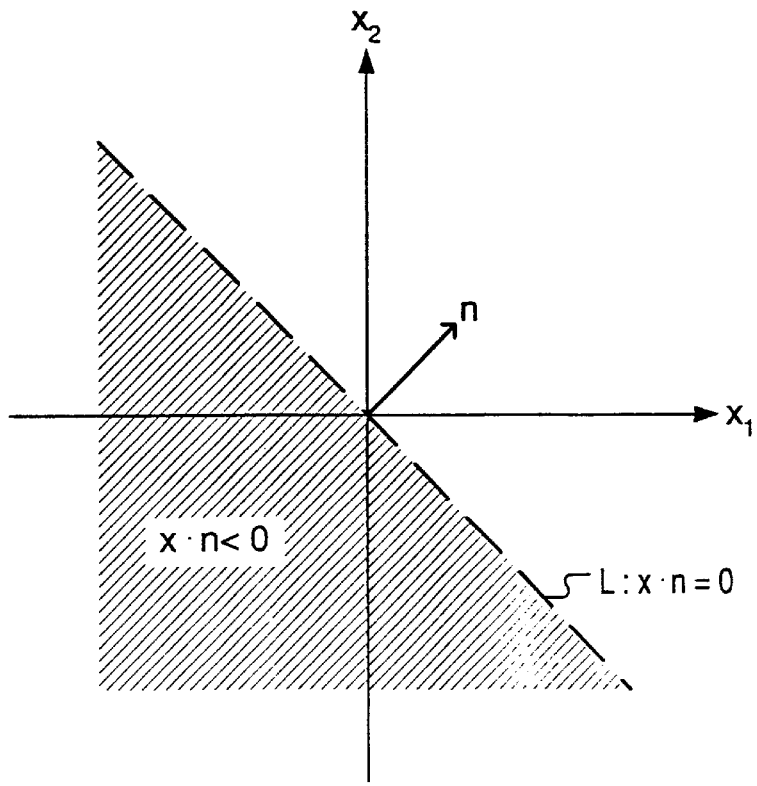
FIG. 8A illustrates mathematical expressions which describe a line through the origin and a corresponding half-plane given a normal vector in two-dimensional space.

The spatial cones used in the preferred embodiment are polyhedral cones. The generic polyhedral cone has a polygonal cross-section. FIG. 7 gives two examples of polyhedral cones. The first polyhedral cone PHC1 has a rectangular cross-section, while the second polyhedral cone PHC2 has a triangular cross-section. The view frustum is a cone with rectangular cross-section like cone PHC1. Polyhedral cones may be defined by homogeneous linear inequalities. Given a normal vector n, the equation n·x=0 involving vector argument x defines a plane passing through the origin and perpendicular to the normal vector n. This plane divides space into two half-spaces. The linear inequality n·x<0 defines the half-space from which the normal vector n points outward. FIG. 8A gives a two-dimensional example. As shown, the equation n·x=0 specifies the set of points (interpreted as vectors) which are perpendicular to normal n. This perpendicular line L divides the plane into two half-planes. The half-plane defined by the inequality n·x<0 is denoted by shading. Observe that the normal vector n points out of this half-plane.

Figure 8B:
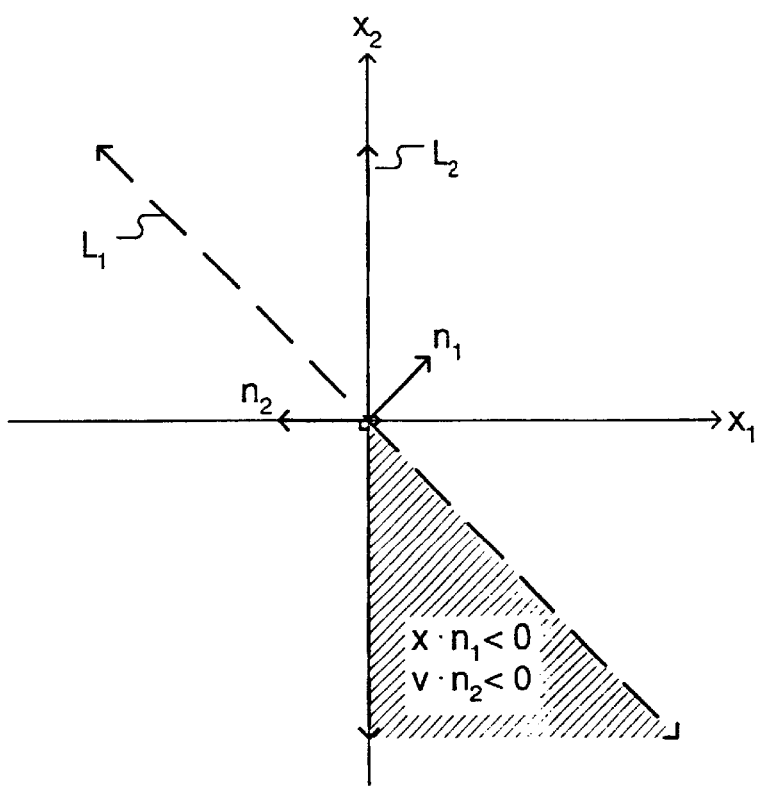
FIG. 8B illustrates the specification of a two-dimensional conic region as the intersection of two half-planes.

A polyhedral cone is constructed by intersection of multiple half-spaces. For example, solid cone PHC2 of FIG. 7 is the intersection of three half-spaces. Similarly, solid cone PHC1 is the intersection of four half-spaces. FIG. 8B provides a two-dimensional example of intersecting half-planes to generate a conic area. The two normal vectors $n_1$ and $n_2$ define perpendicular lines $L_1$ and $L_2$ respectively. The inequality $n_1 \cdot x < 0$ specifies the half-plane which is southwest (i.e. left and below) of the line $L_1$. The inequality $n_2 \cdot x < 0$ defines the half-plane which is to the right of line $L_2$. The solution to the simultaneous system of inequalities $n_1 \cdot x < 0$ and $n_2 \cdot x < 0$ is the intersection region denoted in shading. This system of inequalities may be summarized by the matrix equation $Sx \leq 0$, where the rows of matrix S are the normal vectors. From this discussion, it may be observed that solid cone PHC1 of FIG. 7 is determined by four normal vectors. The normal matrix S would then have four rows (for the four normal vectors) and three columns corresponding to the dimension of the ambient space.

Thus, a polyhedral cone emanating from the origin is defined as the set of points satisfying a system of linear inequalities $Sx \leq 0$. [There is no loss of generality in assuming the origin to be the viewpoint.] According to this definition, half-spaces, planes, rays, and the origin itself may be considered as polyhedral cones. In addition, the entire space may be considered to be a polyhedral cone, i.e. that cone which is defined by an empty matrix S.

Distance Measurement

The distance of an object, hull, or bound from a particular viewpoint is defined to be the minimum distance to the object, hull, or bound from the viewpoint. So, assuming a viewpoint at the origin, the distance of the object, hull, or bound X from the viewpoint is defined as $$f(X) = \min_{x \in X} \|x\|,$$

where $\|x\|$ is the norm of vector x.

Any vector norm may be chosen for the measurement of distance. In one embodiment, the Euclidean norm is chosen for distance measurements. The Euclidean norm results in a spherically shaped wavefront. More generally, a distance measurement f(X) may be based on any wavefront as long as the wavefront shape satisfies a mild "star-shape" criterion, i.e. the entire boundary of the wavefront is unobstructed when viewed from the origin. All convex wavefronts satisfy this condition, and many non-convex ones do as well. In general, the level curves of a norm are recommended as the wavefront shapes. From a computational standpoint, the spherical wavefront shape given by the $L^2$ norm, and the piecewise-linear wavefront shapes given by the $L^1$, and $L^\infty$ norms provide good choices for visibility detection. It is noted that a piecewise-linear approximation of such a norm may be used instead of the norm itself.

Cones and Visibility

Consider an arbitrary cone K emanating from the origin as a viewpoint. Define the distance of an object, hull, or bound X relative to the cone K as $$f_K(X) = \min_{x \in X \cap K} \|x\|,$$

where the symbol $\cap$ denotes set intersection. If the distance $f_K$ is computed for each object X in a scene, the nearest object, i.e. the object which achieves a minimum distance value $f_K$, is at least partially visible with respect to cone K.

As discussed above, the ray-based methods of the prior art are able to detect objects only up the resolution of the ray sample. Small visible objects or small portions of larger objects may be missed entirely due to insufficient ray density. In contrast, cones can completely fill space. Thus, the cone-based method disclosed herein may advantageously detect small visible objects or portions of objects that would be missed by a ray-based method with equal angular resolution.

Generalized Separation Measurement

For the purposes of performing a visibility search procedure, it is necessary to have a method for measuring the extent of separation (or conversely proximity) of objects, bounds, or hulls with respect to cones. There exists a great variety of such methods in addition to those based on minimizing vector norms defined above.

In some embodiments, the separation between a set X and a cone K may be computed based on the model of wavefront propagation. A wavefront propagating internal to the cone from the vertex of the cone has a radius of first interaction with the set X. This radius of first interaction may provide a measurement value of the separation between the set X and the cone K. The wavefront may satisfy a mild "star shape" condition, i.e. the entire boundary of the wavefront is visible from the vertex of the cone.

In one embodiment, the measurement value is obtained by computing a penalty of separation between the set X and the cone K. The penalty of separation may be evaluated by minimizing an increasing function of separation distance between the vertex of the cone K and points in the intersection of the cone K and set X. For example, any positive power of a vector norm gives such an increasing function.

In another embodiment, the measurement value is obtained by computing a merit of proximity between the set X and the cone K. The merit of proximity may be evaluated by maximizing a decreasing function of separation distance between the vertex of the cone K and points in the intersection of the cone K and set X. For example, any negative power of a vector norm gives such a decreasing function of separation.

A Cone Hierarchy

In the preferred embodiment, visible objects are determined by operating on a hierarchy of cones in addition to the hierarchy of hulls described above. The class of polyhedral cones is especially well suited for generating a cone hierarchy. Polyhedral cones naturally decompose into polyhedral subcones by the insertion of one or more separating planes. The ability to nest cones into a hierarchical structure may allow a rapid examination of object visibility. As an example, consider two neighboring cones that share a common face. By taking the union of these two cones, a new composite cone is generated. The composite cone neatly contains its children, and is thus capable of being used in querying exactly the same space as its two children. In other words, the children cones share no interior points with each other and they completely fill the parent without leaving any empty space.

A typical display and its associated view frustum has a rectangular cross-section. Various possibilities are contemplated for tessellating this rectangular cross-section to generate a system of sub-cones. For example, the rectangle naturally decomposes into four rectangular cross-sections, or two triangular cross-sections. Although these examples illustrate decompositions using regular components, irregular components may be used as well.

FIGS. 9A–9C illustrate a hierarchical decomposition of an initial view frustum C. FIG. 9A depicts the rectangular cross-section of the view frustum and its bisection into two cones with triangular cross-section, i.e. cones C0 and C1. The view frustum C corresponds to the root node of a cone tree. Cones and their corresponding nodes in the cone tree are identically labeled for simplicity. Each node of the cone tree stores the matrix S of normal vectors which generate the corresponding cone. The root node points to two children nodes corresponding to cones C0 and C1. FIG. 9B illustrates a second decomposition stage. Each of the cones C0 and C1 is bisected into two sub-cones (again with triangular cross-section). Cone C0 decomposes into the two sub-cones C00 and C01. Likewise, cone C1 is bisected into two sub-cones C10 and C11. Nodes are added to the cone tree to reflect the structure of this decomposition. The parent-child relation of nodes in the cone tree reflects the superset-subset relation of the respective cones in space. FIG. 9C illustrates the pattern of successive cone bisections according to one embodiment. Each cone in the hierarchy may be decomposed into two sub-cones by means a bisecting plane. FIG. 9C illustrates several successive descending bisections which generate cones C0, C10, C110, and C110, and so on. The initial cone C (i.e. the view frustum) may be decomposed to any desired resolution. In one embodiment, the bisections terminate when the resultant cones intercept some fraction of a pixel such as, for example, ½ a pixel. The corresponding terminal nodes of the cone tree are called leaves. Alternate embodiments are contemplated where the bisections terminate when the resultant leaf-cones intercept areas which subtend (a) a portion of pixel such as 1/N where N is a positive integer, or (b) areas including one or more pixels.

The triangular hierarchical decomposition shown in FIGS. 9A–9C has a number of useful properties. By decomposing the original rectangular cone based on recursive bisection, a binary tree of cones of arbitrary depth is generated. Triangular cones have the fewest sides making them computationally more attractive. In addition, triangular cones can also tessellate the entire space surrounding the viewpoint. Imagine a unit cube with viewpoint at the center. The root cone may be the entire space. The root cone may have six subcones which intercept the six corresponding faces of the cube. Thus, it is possible to create a hierarchical cone representation for the entire space surrounding the viewpoint.

It is noted that any cone decomposition strategy may be employed to generate a cone hierarchy. In a second embodiment, the view frustum is decomposed into four similar rectangular cones; each of these subcones is decomposed into four more rectangular subcones, and so on. This results in a cone tree with four-fold branches.

As used herein, a cone K is said to be a descendent of cone C when cone C contains cone K. Thus, all the cones beneath cone C in the cone hierarchy are said to be descendents of cone C.

Discovering the Set of Visible Objects

Once the hull hierarchy and the cone hierarchy have been constructed, the set of visible objects may be computed with respect to the current viewpoint. In one embodiment, the visible object set is repeatedly recomputed for a succession of viewpoints, viewing directions, video frames, etc. The successive viewpoints and/or viewing directions may be specified by a user through an input device such as a mouse, joystick, keyboard, trackball, head-position sensor, eye-orientation sensor, or any combination thereof. A visible object determination method may be organized as a simultaneous search of the hull tree and the cone tree. The search process may involve recursively performing hull-cone queries. Given a cone node K and a hull node H, a hull-cone query on cone K and hull H investigates the visibility of hull H and its descendent hulls with respect to cone K and its descendent cones. The search process has a computational complexity of order log M, where M equals the number of cone nodes times the number of hull nodes. In addition, many hull-cone queries can occur in parallel allowing aggressive use of multiple processors in constructing the visible-object-set.

Viewing the Scene

The set of visible objects from the current viewpoint may be rendered on one or more displays. Display rendering and visible object determination may be performed independently and concurrently. The display rendering and visible object determination may occur concurrently because the visible-object-set remains fairly constant between frames in a walkthrough environment. Thus, the previous set of visible objects provides an excellent approximation to the current set of visible objects.

Managing the Visible-object-set

The visualization software executing on graphical computing system 80 may manage the visible-object-set. Over time, as an end-user navigates through a model, simply inserting objects into the visible object set would result in a visible object set that contains too many objects. Thus, the visualization process may remove objects from the visible object set when those objects no longer belong to the set—or soon thereafter. A variety of solutions to object removal are possible. One solution is based on object aging. The system removes any object from the visible object set that has not been rediscovered by the cone query within a specified number of redraw cycles.

Computing Visibility Using Cones

Substantial computational leverage may be provided by recursively searching the hierarchical tree of cones in conjunction with the hierarchical tree of hulls. Whole groups of cones may be tested against whole groups of hulls in a single query. For example, if a parent cone does not intersect a parent hull, it is obvious that no child of the parent cone can intersect any child of the parent hull. In such a situation, the parent hull and all of its descendants may be removed from further visibility considerations with respect to the parent cone.

Visibility Search Algorithm

In one embodiment, processors $PR_1$ through $PR_M$ may implement a recursive search of the two trees (the object tree and the cone tree) to assign visible objects to leaf cones of the cone tree. In an alternate embodiment, the recursive search of the two trees may be performed by processors configured within graphics accelerator 112.

The recursive search of the two trees provides a number of opportunities for aggressive pruning of the search space. Central to the search is the object-cone distance measure defined above, i.e. given a cone K and an object (or hull) X, the object-cone distance is defined as $$f_K(X) = \min_{x \in X \cap K} \|x\|.$$

It is noted that this minimization is in general a nonlinear programming problem since the cones and object hulls are defined by constraint equations, e.g. planes in three-space. If the vector norm $\|x\|$ is the $L^1$ norm (i.e. the norm defined as the sum of absolute values of the components of vector x), the nonlinear programming problem reduces to a linear programming problem. If the vector norm $\|x\|$ is the Euclidean norm, the nonlinear programming problem reduces to a quadratic programming problem. Given a collection of objects, the object X which achieves the smallest distance $f_K(X)$ with respect to cone K is closest to the cone's viewpoint, and therefore is at least partially visible.

The recursive search may explore hull-cone pairs starting with the pair defined by the root hull of the hull tree and the root cone of the cone tree (see FIGS. 4 and 9). The recursive search mechanism is built upon several basic elements. A distance measurement function computes the distance $f_K(X)$ of a hull X from the viewpoint of a cone K as seen from within cone K. In other words, the distance measurement function determines the cone-restricted distance to the hull X. In some embodiments, the minimization associated with evaluating the distance measurement function is implemented by solving an associated linear (or non-linear) programming problem.

To facilitate the search process, each leaf-cone, i.e. each terminal node of the cone tree, is assigned an extent value which represents its distance to the closest known object-hull as seen within the cone. [An object-hull is a hull that directly bounds an object. Object-hulls are terminal nodes of the hull tree.] Thus, this extent value may be referred to as the visibility distance. The visibility distance of a leaf-cone is non-increasing, i.e. it decreases as closer objects (i.e. object hulls) are discovered in the search process. Visibility distances for all leaf-cones may be initialized to positive infinity. In addition to a visibility distance value, each leaf-cone node is assigned storage for a pointer which points to a currently visible object. This object pointer may be initialized with a reserved value denoted NO_OBJECT which implies that no object is yet associated with the leaf-cone. In another embodiment, the object pointer may be initialized with a reserved value denoted BACKGROUND which implies that a default scene background is associated with the leaf-cone.

In addition, each non-leaf cone, i.e. each cone at a non-final refinement level, may be assigned an extent value which equals the maximum of the extent values of its sub-cones. Or equivalently, the extent value for a non-leaf cone may be set equal to the maximum of the visibility distance values of its leafcone descendents. These extent values are also referred to as visibility distance values. The visibility distance values for all non-leaf cones are also initialized to positive infinity (consistent with the initialization of the leaf-cones). Suppose a given non-leaf cone K and a hull X achieve a cone-object distance $f_K(X)$. If this distance $f_K(X)$ is greater than the visibility distance value of the cone K, then all of the leaf-cone descendents of cone K already have known objects closer than the hull H. Therefore, little or no benefit may be gained by searching hull H against cone K and its descendents. In contrast, if a hull H achieves a distance $f_K(X)$ from cone K which is less than the visibility distance value of cone K, it is possible that hull H contains objects which will strictly decrease the visibility distance of some leaf-cone descendent of cone K. Thus, the hull H and its descendents may be searched against cone K and its descendents. The computation of the hull-cone distance $f_K(X)$ for cone K and hull H may be implemented by a software function Dist(H,K).

A global problem queue may be maintained in shared memory 106. The global problem queue may store hull-cone pairs (H,C) which are to be searched. In one embodiment, the global problem queue may initially contain one pair $(H_R, C_R)$ corresponding to the root hull $H_R$ of the hull hierarchy and the root cone $C_R$ of the cone hierarchy. Alternatively, the global problem queue may be initially loaded with all hull-cone pairs of the form $(H_{n,i}, C_{m,j})$, where hull $H_{n,i}$ is a hull in layer n of the hull hierarchy, and cone $C_{m,j}$ is a cone in layer m of the cone hierarchy, wherein n and m are integers greater than or equal to zero. Layer zero of the hull hierarchy corresponds to the root hull. Layer zero of the cone hierarchy corresponds to the root cone.

For example, assuming the cone and hull hierarchies are binary trees, the second level below the root hull contains four hulls, and the third level below the root cone contains eight cones. Thus, the global problem queue may be initially loaded with the 32=4×8 hull-cone pairs generated by these four hulls and eight cones.

In addition, the hull hierarchy and the cone hierarchy may be stored in shared memory 106. Each processor $PR_1$, may cache portions of the hull hierarchy and cone hierarchy as needed.

Figure 10A:
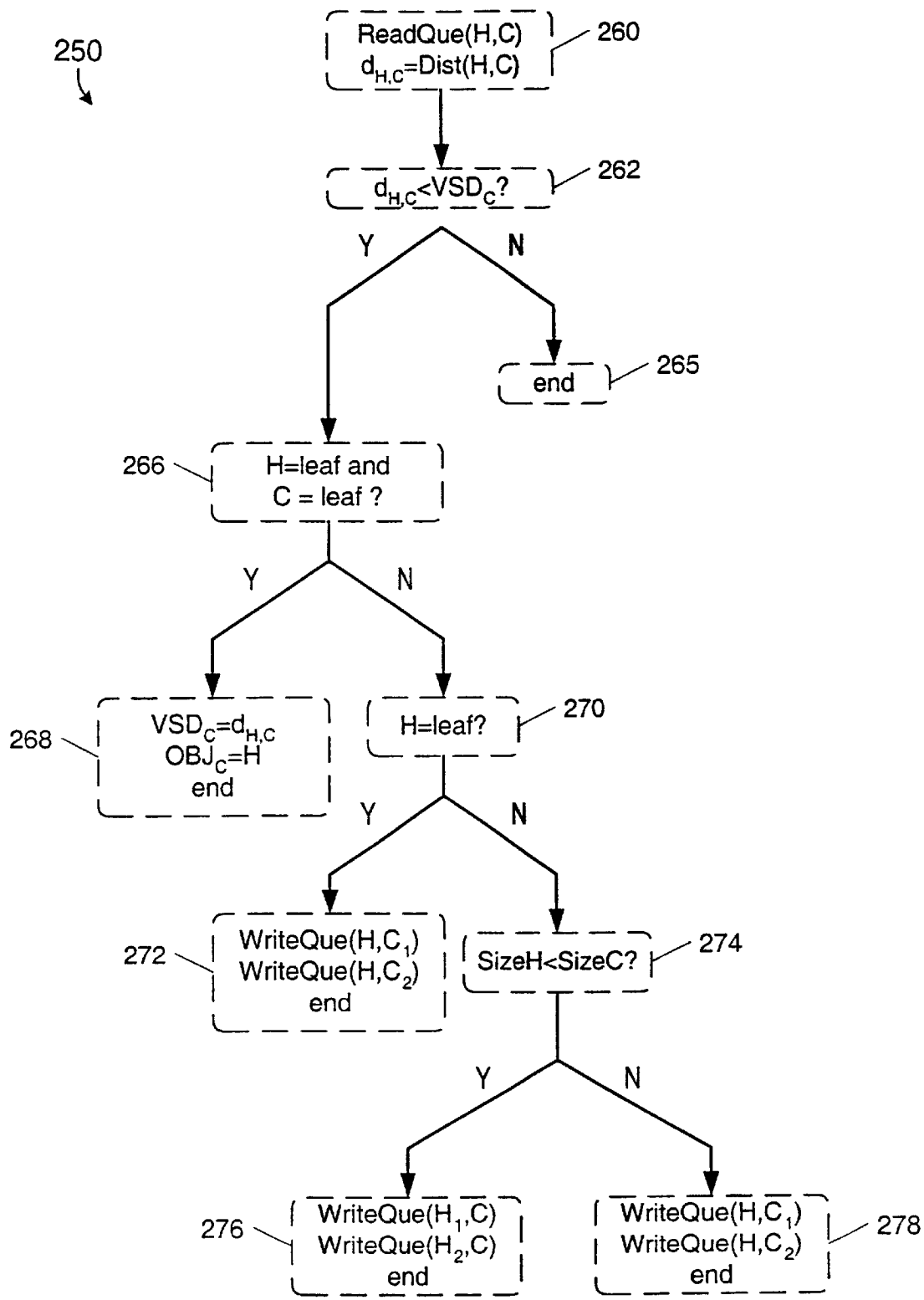
FIG. 10A illustrates one embodiment of a program thread 250 which is executed by each of multiple processors to accomplish a dual search of the hull hierarchy and cone hierarchy.

Each of processors $PR_1$ through $PR_M$ may participate in a parallel search of the hull hierarchy and cone hierarchy. When a processor $PR_1$, becomes available, processor $PR_1$, (referred to as "the processor" in the following discussion) may perform computations on a hull-cone pair as indicated in FIG. 10A. In step 260, the processor reads the global problem queue to obtain a hull-cone pair (H,C). The hull-cone pair (H,C) may comprise a pointer to hull H in the cone hierarchy and a pointer to cone C in the cone hierarchy. Furthermore, the processor may compute the hull-cone distance $d_{H,C}$ between hull H and cone C by invoking the function Dist. Alternatively, the code for computing the hull-cone distance may be configured as in-line code.

In step 262, the processor may determine if the hull-cone distance $d_{H,C}$ is less than the visibility distance $VSD_C$ of cone C. If the hull-cone distance $d_{H,C}$ is not less than the visibility distance $VSD_C$ of cone C, the processor may terminate processing as indicated in step 265.

If, in step 262, the hull-cone distance $d_{H,C}$ is determined to be less than the visibility distance $VSD_C$ of cone C, step 266 may be performed.

In step 266, the processor may determine if hull H and cone C are both leaves of their respective hierarchies. If hull H and cone C are both leaf nodes, step 268 may be performed.

In step 268, the processor may update the visibility data of the leaf cone C. For example, the processor may set the visibility distance $VSD_C$ of the leaf cone C equal to the hull-cone distance $d_{H,C}$, and the object pointer $OBJ_C$ for leaf cone C equal to the leaf hull H, or a pointer to leaf hull H, or a pointer to an object contained within leaf hull H.

If hull H and cone C are not both leaves, the processor may perform step 270. In step 270, the processor may determine if hull H is a leaf of the hull hierarchy. If hull H is a leaf of the hull hierarchy, the processor may perform step 272.

In step 272, the processor may write to the global problem queue two hull-cone pairs, i.e. pair $(H,C_1)$ corresponding to hull H and a first subcone $C_1$ of cone C, and pair $(H,C_2)$ corresponding to hull H and a second subcone $C_2$ of cone C. More generally, for cone hierarchies which allow more than two subcones per cone, the processor may write to the global problem queue all pairs of the form $(H,C_I)$ where $C_I$ is a subcone of cone C. After writing the hull-cone pairs to the global problem queue, the processor may terminate processing.

If, in step 270, the processor determines that hull H is not a leaf hull, step 274 may be performed. In step 274, the processor may compute a normalized size SizeH for hull H and a normalized size SizeC for cone C, and may compare SizeH and SizeC. A variety of methods are contemplated for computing the hull size and cone size. If SizeH is smaller than SizeC, step 276 may be performed.

In step 276, the processor may write a hull-cone pair $(H_I,C)$ to the global problem queue for each subhull $H_I$ of hull H, i.e. all pairings of cone C with the subhulls of hull H. After writing the hull-cone pairs to the global problem queue, the processor may terminate processing, e.g., may enter an idle state.

If, in step 274, the processor determines that SizeH is not less than SizeC, the processor may perform step 278. In step 278, the processor may write a hull-cone pair $(H,C_I)$ to the global problem queue for each subcone $C_I$ of cone C, i.e. all pairings of hull H with the subcones of cone C. After writing the hull-cone pairs to the global problem queue, the processor may terminate processing.

When the processor terminates processing as indicated in steps 265, 268, 272, 276 and 278, it becomes available for processing another hull-cone pair. Thus, the processor may immediately re-execute the program thread described in FIG. 10A, and thereby, access and operate on the next available hull-cone pair from the global problem queue.

Thus, each of processors $PR_1$ through $PR_M$ may cooperate in the effort of searching the cone hierarchy and hull hierarchy. Each execution of the program thread 250 of FIG. 10A by one of processors $PR_1$ through $PR_M$ consumes a hull-cone pair (H,C) from the global problem queue, and may add to the global problem queue (a) two or more hull-cone pairs of the form $(H_I,C)$ where $H_I$ runs through the subhulls of hull H, or (b) two or more hull-cone pairs of the form $(H,C_I)$ where $C_I$ runs through the subcones of cone C. In the case where the hull-cone distance $d_{H,C}$ is not less than the visibility distance $VSD_C$ of cone C, new hull-cone pairs are not added to the global problem queue. When a hull-cone pair (H,C) corresponds to a leaf hull and a leaf cone, the visibility distance and object pointer of the leaf cone are updated, and no new hull-cone pairs are added to the global problem queue.

In one embodiment, each processor $PR_1$, executes a local copy of program thread 250 stored in a local memory dedicated for processor $PR_I$. Thus, processor $PR_1$, need not compete with other processors to access shared memory 106 for program code.

As described above, graphical computing system 80 may use a single global problem queue. All initial problems, i.e. hull-cone pairs, may be loaded into the global problem queue.

The operation of all processors repeatedly executing program thread 250 as they become available achieves the determination of the set of visible objects. When the global problem queue is empty and all processors have terminated, the set of visible objects will have been identified. The nearest object pointer for each leaf cone of the cone hierarchy defines the nearest object visible with respect to the leaf cone, i.e. as seen within the leaf cone. Because neighboring leaf cones may share the same nearest objects, the object pointers associated with the leaf cones of the cone hierarchy may be processed to remove any redundancies before transmission to the rendering agent.

Local Problem Queue Per Processor

In some embodiments, graphical computing system 80 includes a series of local problem queues, i.e. one local problem queue per processor and a main problem queue. The main problem queue may reside in shared memory 106 and stores the initial hull-cone pairs. The local memory of each processor stores one of the local problem queues.

Figure 10B:
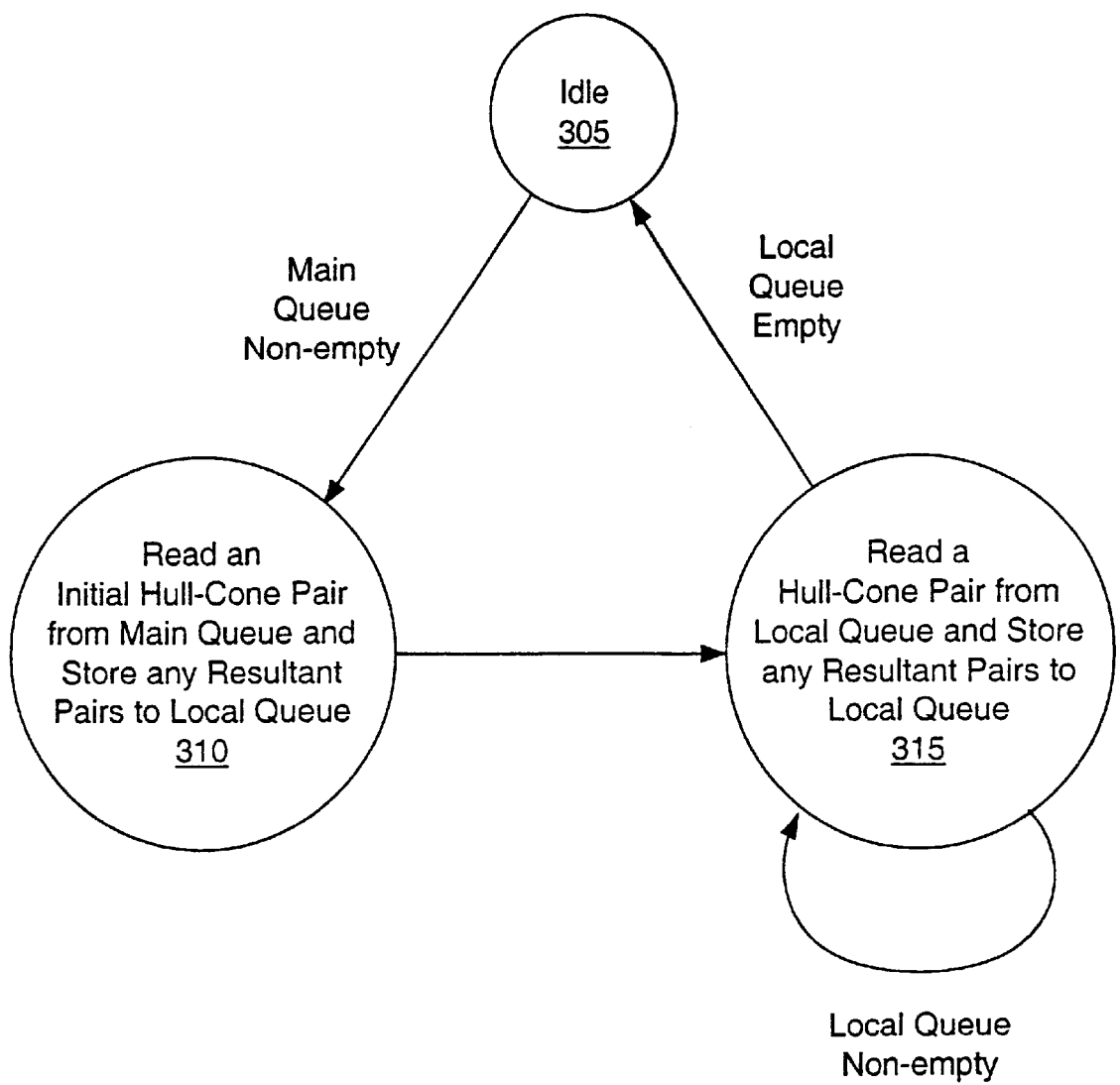
FIG. 10B illustrates an embodiment of graphical computing system 80 where each of multiple processors reads initial hull-cone pairs from a global problem queue, and accesses non-initial hull-cone pairs from a corresponding local queue.

Each processor $PR_1$ may initially reside in an idle state 305 as shown in FIG. 10B. If the main problem queue is non-empty, processor $PR_1$ may transition to state 310. In state 310, processor $PR_1$ may read an initial hull-cone pair from the main problem queue, and operate on the initial hull-cone pair as described in connection with program thread 250 above with the exception that any hull-cone pairs generated in response to the initial hull-cone pair (by program thread 250) are written to the local problem queue of processor $PR_1$ instead of main problem queue. After executing the program thread 250 on the initial hull-cone pair, processor $PR_1$ may transition to state 315.

In state 315, processor $PR_1$ may read a hull-cone from its local problem queue, and operate on the hull-cone pair as described above in connection with problem thread 250 again with the exception that any hull-cone pairs generated in response to the received hull-cone pair may be stored in the local problem queue. Processor $PR_1$ may repeatedly visit state 315 as long as the local problem queue is non-empty. When the local problem queue of processor $PR_1$ becomes empty, processor $PR_1$ may return to the idle state 305.

Because each processor operates from its local problem queue and accesses the main problem queue when its local problem queue is empty, memory access conflicts to the main problem queue may be minimized.

In one embodiment, if the main problem queue is empty and the local problem queue of a processor $PR_1$ is empty, processor $PR_1$ may read a hull-cone pair from the local problem queue of another processor $PR_J$, thus balancing the load between processors.

After the main problem queue and all local problem queues are empty, the set of visible objects will have been determined.

Distributing Cones to Processors

In some embodiments, a collection of cones from the cone hierarchy may be distributed to processors $PR_1$ through $PR_M$. The cones comprising the collection preferably are non-overlapping and fill up the space of the root cone. For example, the cone collection may be the complete set of cones at some $K^{th}$ level below the root cone, where K is a positive integer. Alternatively, the cone collection may comprise cones from various levels of the cone hierarchy.

Each cone from the cone collection is assigned to one and only one of the processors $PR_1$ through $PR_M$. In other words, in this embodiment, a cone from the cone collection is not assigned to multiple processors. For each cone C assigned to processor $PR_I$, processor $PR_1$ (or some external agent) may load an initial hull-cone pair $(H_R,C)$ corresponding to the root hull and cone C into its local problem queue.

Figure 10C:
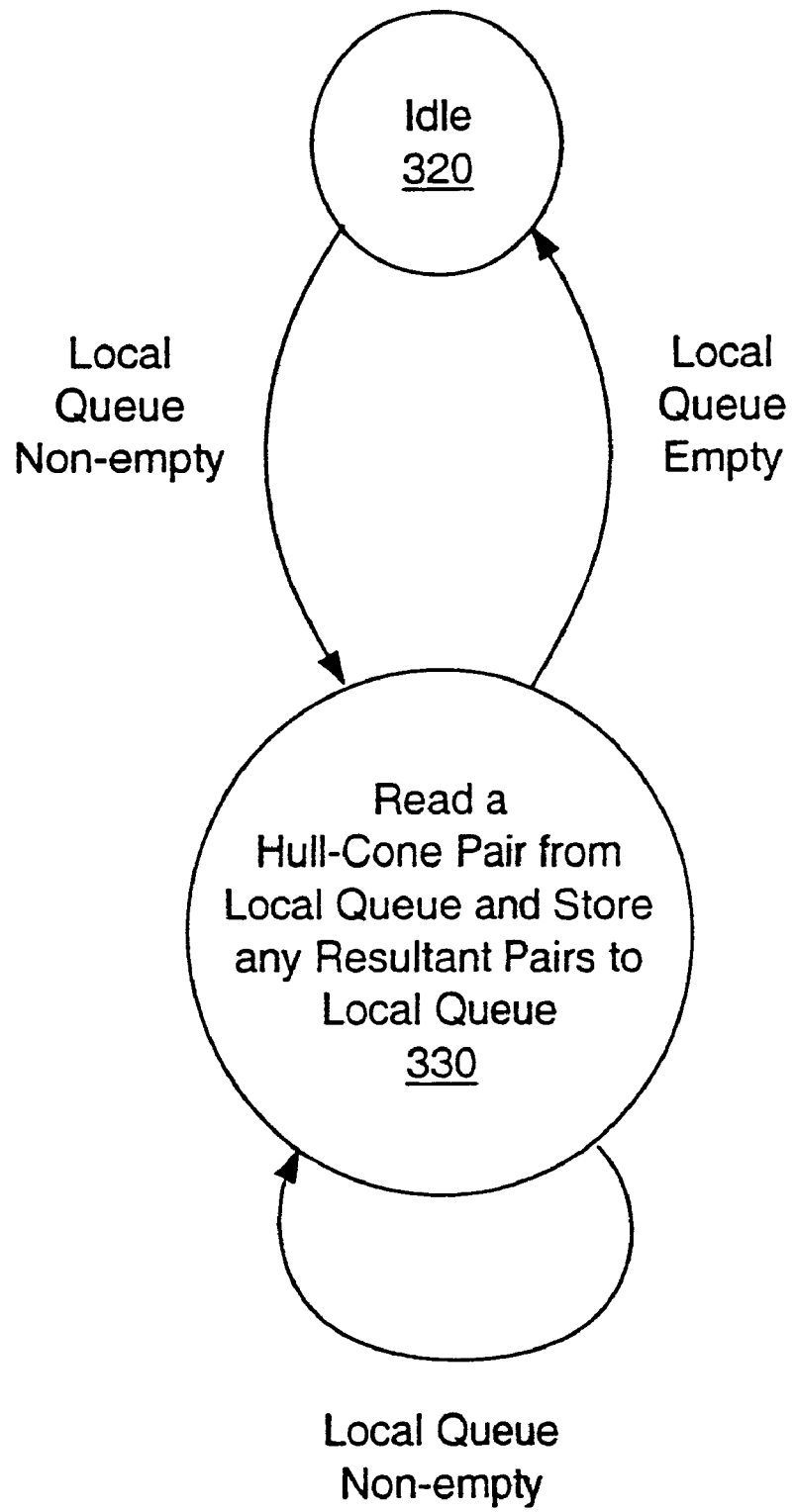
FIG. 10C illustrates an embodiment of graphical computing system 80 where cones from the cone hierarchy are distributed among a plurality of processors, and each processor searches the assigned cones (and their descendents) with respect to the hull hierarchy.

Processor $PR_1$ may operate as described in FIG. 10C. Processor $PR_1$, may initially reside in an idle state 320. In response to the local queue being non-empty, processor $PR_1$ may transition to state 330.

In state 330, processor $PR_1$ may read a hull-cone pair, e.g. one of the initial hull-cone pairs ($H_R$,C), from the local problem queue, and operate on the hull-cone pair as described in connection with program thread 250 above with the exception that any responsively generated hull-cone pairs are written to the local problem queue. After executing the program thread 250 on a given hull-cone pair, processor $PR_1$ may return to state 330 to read and operate on another hull-cone pair from the local problem queue. Processor $PR_1$ may revisit state 330 as long as the local problem queue remains non-empty. When the local problem queue is empty, processor $PR_1$ may return to idle state 320.

Size Conditioned Tree Search

As described above in connection with step 274, processor $PR_1$ determines a normalized size Size_C for cone C and a normalized size Size_H for hull H. In one embodiment, Size_H may be computed by dividing a solid diameter (or the square of a solid diameter) of hull H by the distance $d_{H,C}$ of hull H with respect cone C. Size_C may be determined by computing the solid angle subtended by cone C. Size_C may also be determined by computing the cone's cross sectional area at some convenient distance (e.g. distance one) from the viewpoint. The cross section may be normal to an axis of the cone C. The cone size Size_C for each cone in the cone hierarchy may be computed when the cone hierarchy is generated (e.g. at system initialization time).

Figure 10D:
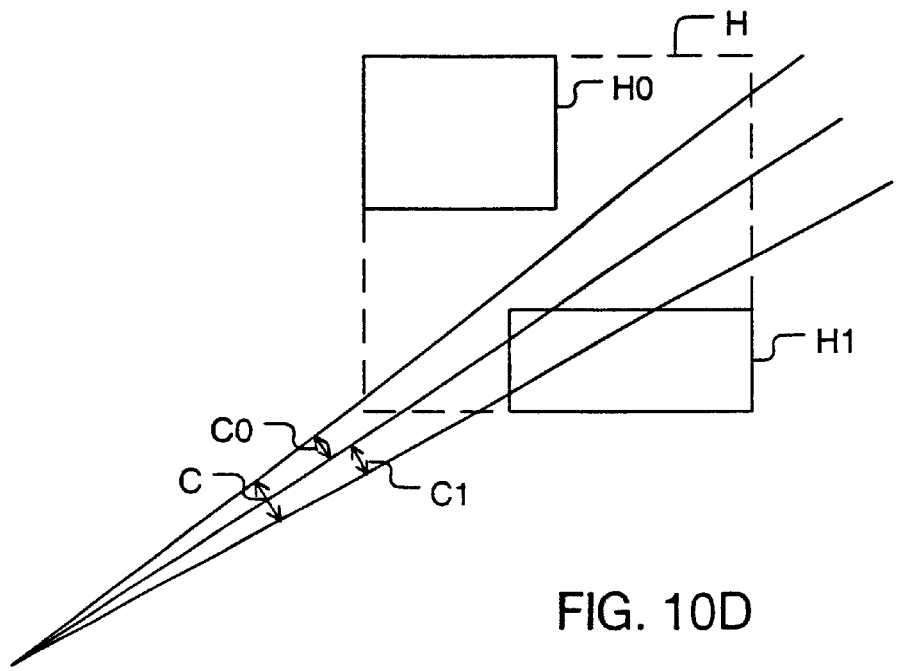
FIG. 10D illustrates a cone C which has a small normalized size compared to a bound hull H.

If the hull size Size_H is larger than the cone size Size_C as suggested by FIG. 10D, on average, the probability of at least one subhull of hull H having an empty intersection with cone C is larger than the probability of at least one subcone of cone C having an empty intersection with hull H. Thus, in this case, it may be more advantageous to explore the subhulls H0 and H1 of hull H with respect to cone C, rather than exploring the subcones of cone C with respect to hull H. For example, FIG. 10D illustrates an empty intersection between subhull H0 and cone C. This implies that none of the descendents of subhull H0 need to be searched against any of the descendents of cone C.

Figure 10E:
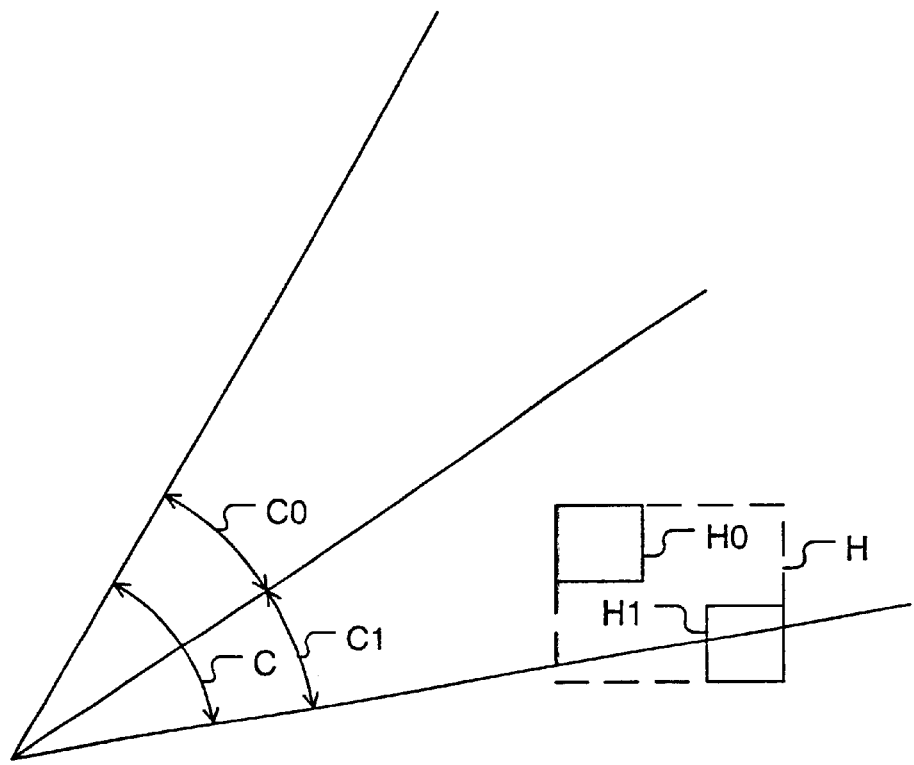
FIG. 10E illustrates a hull H which has a small normalized size compared to a cone C.

If the hull size Size_H is smaller than the cone size Size_C as suggested by FIG. 10E, on average, the probability of at least one subhull of hull H having an empty intersection with cone C is smaller than the probability of at least one subcone of cone C having an empty intersection with hull H. Thus, in this case, it may be more advantageous to explore the subcones C0 and C1 of cone C with respect to hull H, rather than exploring the subhulls of hull H with respect to cone C. For example, FIG. 10E illustrates an empty intersection between subcone C0 and hull H. This implies that none of the descendents of subcone C0 need to be searched against any of the descendents of hull H.

By selecting the larger entity (hull or cone) for refinement, the program thread 250 may more effectively prune the combined hull-cone tree, and determine the set of visible objects with increased efficiency.

Method for Constructing a Bounding Hierarchy

Figure 11:
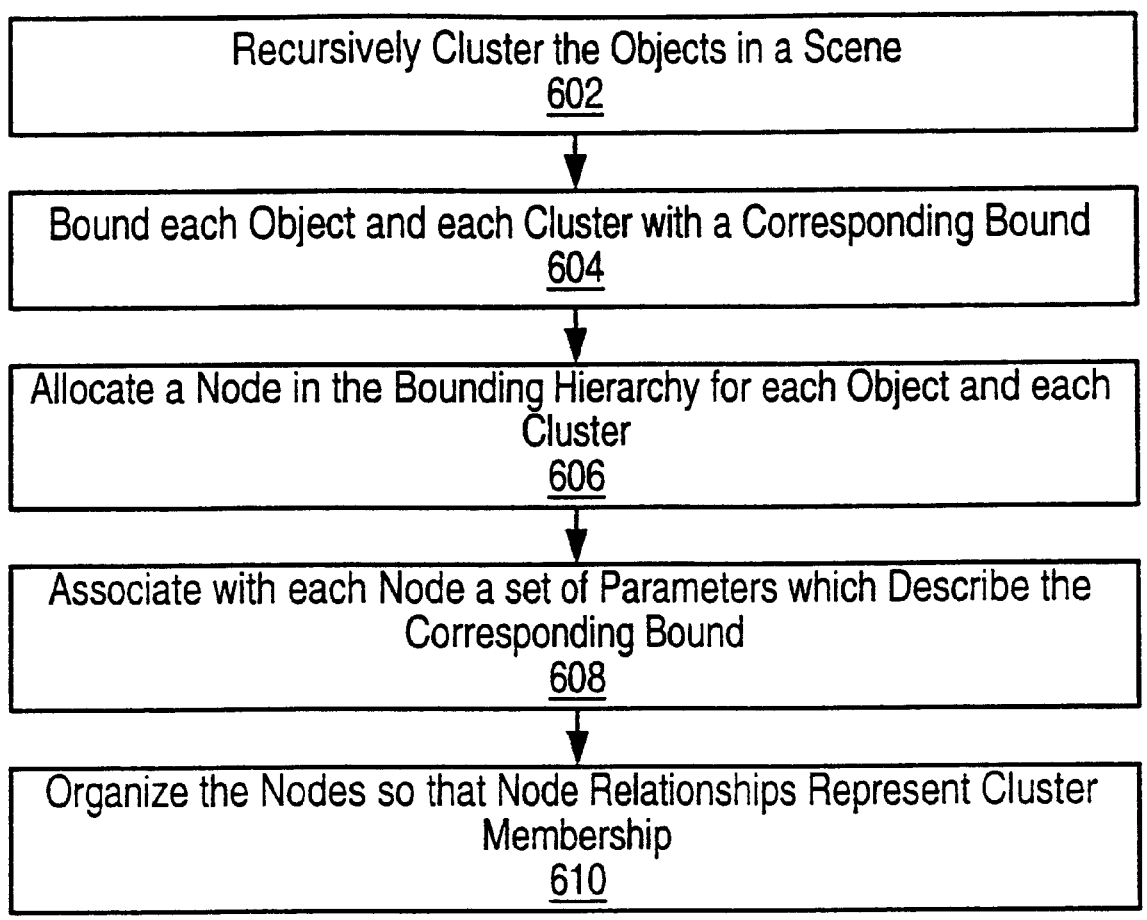
FIG. 11 illustrates one embodiment of the process of recursively clustering a collection of objects to form a bounding hierarchy.

FIG. 11 illustrates the construction of a bounding hierarchy (i.e. a bounding tree structure) from a collection of objects. The collection of objects may be accessed from memory 106. In step 602, the objects in the graphics scene may be recursively clustered. Objects may be assembled into clusters preferably based on proximity. These first order clusters are themselves assembled into second order clusters. Clusters of successively higher order are formed until all the objects are contained in one universal cluster. Objects may be considered as order zero clusters. In step 604, each cluster of all orders is bounded with a corresponding bound. The bounds are preferably polytope hulls as described above in connection with FIGS. 4 and 5. However, other types of bounds are contemplated such as, e.g., quadratic surfaces, generalized polynomial bounds, etc.

In step 606, a hierarchical tree of bounds is generated by allocating a node for each of the objects and clusters. In step 608, each node is assigned parameters which describe (characterize) the corresponding bound. In one embodiment this parameter assignment comprises storing the extent vector c which locates the polytope hull faces as described in connection with FIGS. 5A and 5B. In step 610, the nodes are organized so that node relationships correspond to cluster membership. For example, if node A is the parent of node B in the bounding hierarchy, then the cluster corresponding to node A contains a subcluster corresponding to node B, and the bound for node A contains the bound for node B.

Although the construction of the cone hierarchy above has been described in terms of recursive clustering, it is noted alternative embodiments are contemplated which use other forms of clustering such as iterative clustering.

Computing the Cone Restricted Distance Function

Recall that evaluation of the hull-cone distance $f_c(H)$ of a hull H from a cone C calls for minimizing $\|x\|$ subject to the hull constraints Ax<b and the cone constraints $Sx \leq 0$. The rows of matrix A comprise normals for the hull surfaces. The rows of matrix S comprise normals for the cone surfaces. This minimization may be formulated as a nonlinear programming problem. For example, the nonlinear programming problem reduces to a quadratic programming problem when a Euclidean norm is used, and a linear programming problem when the $L^1$ norm is used. The hull-cone distance computation is herein referred to as a geometric query.

It is also noted that hull-cone separation may be measured by maximizing an decreasing function separation such as $\|x\|^{-1}$ for points x satisfying the bound/hull constraints and the cone constraints. Thus, in general a hull-cone separation value may be computed by determining an extremal (i.e. minimal or maximal) value of the separation function subject to the cone constraints and the bound/hull constraints.

The use of a hierarchy of cones instead of a collection of rays is motivated by the desire for computational efficiency. Thanks to early candidate pruning that results from the double recursion illustrated earlier, fewer geometric queries are performed. These queries however are more expensive than the queries used in the ray casting method. Therefore, the cone query calculation may be designed meticulously. A sloppy algorithm could end up wasting most of the computational advantage provided by improvements in the dual tree search. For the linear programming case, a method for achieving a computationally tight query will now be outlined.

A piecewise-linear formulation of distance $f_C$ leads to the following linear program:

$$\min(v^T x)$$

subject to $Ax \leq b, Sx \leq 0$.

The vector v is some member of the cone that is polar to the cone C. For instance, $v=-S^T e$, where e is the vector of all ones. [It is noted that the matrix S of cone normals S are outward normals to the cone surfaces. Thus, the negation of the sum of the normal vectors gives a polar vector.] The condition $Ax \leq b$ implies that the point x is within the bounding hull. The condition $Sx \leq 0$ implies that the point x is within the cone C. For an efficient solution method, the linear program problem is restated in term of its dual:

$$\max(b^T y)$$

subject to $A^T y + S^T z = v$, $0 \leq y$, $0 \leq z$.

The dual objective value, $b^T y$ is infinite when the cone and bounding hull do not intersect (the variables y and z are the Lagrange multipliers of the previous problem's constraints).

In the preferred embodiment, the bounding hulls have sides normal to a fixed set of normal vectors. Thus, the matrix $A^T$ is the same for all hulls. For a given cone, the matrix $S^T$ and the vector v are also fixed. From this observation, it is apparent that the multi-dimensional polyhedron $$\{(y,z): A^T y + S^T z = v, \ 0 \leq y, \ 0 \leq z\}$$

is associated with the cone. (In one embodiment, this polyhedron has seventeen dimensions. Fourteen of those dimensions come from the type of the fixed-direction bounding hull and an three additional dimensions come from the cone.) Since the polyhedron depends only on the cone matrix S, it is feasible to completely precompute the extremal structure of the polygon for each cone in the cone hierarchy. By complementary slackness, the vertices of the polyhedron will have at most three elements. The edges and extremal rays will have at most four non-zero elements. An abbreviated, simplex-based, hill-climbing technique can be used to quickly solve the query in this setting.

In one embodiment, the entire space is tessellated with cones, and visible objects are detected within the entire space. After this entire-space visibility computation, the set of visible objects may be culled to conform to the current view frustum, and the visible objects which survive the frustum culling may be rendered and displayed.

In an alternative embodiment, a less aggressive approach may be pursued. In particular, by determining beforehand a collection of the cones in the cone hierarchy which correspond to the view frustum in its current orientation, only this collection may be included in the visible-object-set computation.

Memory Media

As described above, the visibility software realized by program thread 250 may be stored in shared memory 106 and/or the local memories of processors $PR_1$ through $PR_M$. In addition, the visibility software may be stored in any desired memory media such as an installation media (e.g. CD-ROM, floppy disk, etc.), a non-volatile memory (e.g. hard disk, optical storage, magnetic tape, bubble memory, ROM, etc.), various kinds of volatile memory such as RAM, or any combination thereof. In some embodiments, the visibility software may be deposited on memory media for distribution to end users and/or customers. Also, the visibility software may be transmitted through a transmission medium (e.g. the atmosphere and/or free space, a network of computers, an electrical conductor, optical fiber, etc.) between an information source and destination.

In one embodiment, the visibility software may be implemented as part of an operating system. In a second embodiment, the visibility software may be implemented as a dynamic link library. In a third embodiment, the visibility software may be implemented as part of a device driver (e.g. a device driver for graphics accelerator 112).

In a fourth embodiment, the visibility software may be implemented as part of a JAVA 3D virtual machine which executes on processors $PR_1$ through $PR_M$. A user may access a remote server through a network. The server responsively generates a stream of graphics data comprising graphical objects. The visibility software executing as part of the JAVA 3D virtual machine may determine a set of visible objects from the graphical objects. The virtual machine may provide the set of visible objects (or pointers to the visible objects) to a rendering agent. The rendering agent may be a hardware rendering unit such as graphics accelerator 112. Alternatively, the rendering agent may be a software renderer.

What is claimed is:

1. A system for displaying visible objects on a display device, the system comprising:

a shared memory configured to store a bound hierarchy and a cone hierarchy;

a plurality of processors coupled to the shared memory, wherein the plurality of processors are operable to perform a search of the cone hierarchy and bound hierarchy to identify one or more nearest objects for cones in the cone hierarchy;

a rendering agent configured to receive an indication of the one or more nearest objects for each of said cones and to transmit pixel data to a display device in response to said one or more nearest object indications for each of said cones.

2. The system of claim 1, wherein the shared memory is further configured to store a first problem queue, wherein each of the plurality of processors is configured to:

(a) read a first bound-cone pair from the first problem queue, wherein the first bound-cone pair points to a first bound in the bound hierarchy and a first cone in the cone hierarchy, (b) compute a bound-cone distance between the first bound and the first cone;

(c) determine if the bound-cone distance is smaller than a first visibility distance associated with the first cone; and (d) write two or more second bound-cone pairs to the first problem queue in response to the bound-cone distance being smaller than the first visibility distance.

3. The system of claim 2, wherein each of said plurality of processors is further operable to compute a bound size for the first bound and a cone size for the first cone, to compare the bound size and the cone size, wherein the two or more second bound-cone pairs correspond to the first bound and subcones of the first cone if the cone size is larger than the bound size.

4. The system of claim 3, wherein the two or more second bound-cone pairs correspond to the first cone and subbounds of the first bound if the cone size is smaller than the bound size.

5. The system of claim 2, wherein each of the plurality of processors is further operable:

to determine if the first cone is a leaf cone and the first bound is a leaf bound;

to perform (c) and (d) if the first cone is not a leaf cone or the first bound is not a leaf bound.

6. The system of claim 5, wherein each of the plurality of processors is further operable to update a nearest object pointer and the first visibility distance associated with the first cone if the first cone is a leaf cone and the first bound is a leaf bound.

7. The system of claim 5, wherein each of said plurality of processors is further operable to update the first visibility distance with the bound-cone distance and the nearest object pointer with a pointer associated with the first bound.

8. The system of claim 1, wherein the rendering agent comprises a graphics acceleration device.

9. The system of claim 1, wherein the rendering agent comprises a software renderer executing on a programmable processor.

10. The system of claim 1, wherein the shared memory is further configured to store a global problem queue, wherein each of the plurality of processors is configured to:
   (a) read a corresponding first bound-cone pair from the global problem queue, wherein the first bound-cone pair points to a first bound in the bound hierarchy and a first cone in the cone hierarchy,
   (b) compute a bound-cone distance between the first bound and the first cone;
   (c) determine if the bound-cone distance is smaller than a first visibility distance associated with the first cone; and
   (d) write two or more second bound-cone pairs to a local memory corresponding to the processor in response to the bound-cone distance being smaller than the first visibility distance.

11. The system of claim 10, wherein each of the plurality of processors is further configured to:
   (e) read a corresponding third bound-cone pair from the corresponding local memory, wherein the third bound-cone pair points to a third bound in the bound hierarchy and a third cone in the cone hierarchy;
   (f) compute a bound-cone distance between the third bound and the third cone;
   (c) determine if the bound-cone distance is smaller than a third visibility distance associated with the third cone; and
   (d) write two or more fourth bound-cone pairs to the corresponding local memory in response to the bound-cone distance being smaller than the third visibility distance.

12. A method for displaying visible objects on a display device, the method comprising:
   storing a bound hierarchy and a cone hierarchy in a shared memory;
   a plurality of processors reading bounds from the bound hierarchy and cones from the cone hierarchy and searching the cones with respect to the bounds to identify one or more nearest objects for the cones in the cone hierarchy;
   said processors providing indications of the one or more nearest objects for each of said cones to a rendering agent;
   said rendering agent generating pixel data in response to said nearest object indications and transmitting the pixel data to a display device.

13. The method of claim 12 further comprising each processor of said plurality of processors:
   (a) reading a first bound-cone pair from a first problem queue, wherein each bound-cone pair points to a corresponding first bound in the bound hierarchy and a corresponding first cone in the cone hierarchy;
   (b) computing a bound-cone distance between the first bound and the first cone;
   (c) determining if the bound-cone distance is smaller than a first visibility distance associated with the first cone; and
   (d) writing two or more second bound-cone pairs to the first problem queue in response to the bound-cone distance being smaller than the first visibility distance.

14. The method of claim 13 further comprising each processor of said plurality of processors:
   computing a bound size for the first bound and a cone size for the first cone;
   comparing the bound size and the cone size, wherein the two or more second bound-cone pairs correspond to the first bound and subcones of the first cone if the cone size is larger than the bound size.

15. The method of claim 14, wherein the two or more second bound-cone pairs correspond to the first cone and subbounds of the first bound if the cone size is smaller than the bound size.

16. The method of claim 13 further comprising each processor of said plurality:
   determining if the first cone is a leaf cone and the first bound is a leaf bound;
   perform (c) and (d) if the first cone is not a leaf cone or the first bound is not a leaf bound.

17. The method of claim 16 further comprising each processor of said plurality updating a nearest object pointer and the first visibility distance associated with the first cone if the first cone is a leaf cone and the first bound is a leaf bound.

18. The method of claim 16 further comprising each processor of said plurality updating the first visibility distance with the bound-cone distance and the nearest object pointer with a pointer associated with the first bound.

19. The method of claim 12 further comprising each processor of said plurality of processors:
   (a) reading a corresponding first bound-cone pair from the global problem queue, wherein the first bound-cone pair points to a first bound in the bound hierarchy and a first cone in the cone hierarchy,
   (b) computing a bound-cone distance between the first bound and the first cone;
   (c) determining if the bound-cone distance is smaller than a first visibility distance associated with the first cone; and
   (d) writing two or more second bound-cone pairs to a local memory corresponding to the processor in response to the bound-cone distance being smaller than the first visibility distance.

20. The method of claim 19 further comprising each processor of said plurality of processors:
   (e) reading a corresponding third bound-cone pair from the corresponding local memory, wherein the third bound-cone pair points to a third bound in the bound hierarchy and a third cone in the cone hierarchy;
   (f) computing a bound-cone distance between the third bound and the third cone;
   (g) determining if the bound-cone distance is smaller than a third visibility distance associated with the third cone; and
   (h) writing two or more fourth bound-cone pairs to the corresponding local memory in response to the bound-cone distance being smaller than the third visibility distance.

21. A computer-readable memory medium for storing program instructions, wherein said program instructions are executable by each processor in a collection of processors to implement the operations of:
   reading a first bound-cone pair from a shared memory, wherein each bound-cone pair points to a corresponding first bound in a bound hierarchy and a corresponding first cone in a cone hierarchy;
   computing a bound-cone distance between the first bound and the first cone;

determining if the bound-cone distance is smaller than a first visibility distance associated with the first cone;

writing two or more second bound-cone pairs to the first problem queue in response to (a) the bound-cone distance being smaller than the first visibility distance, and (b) the first bound being a non-terminal bound of the bound hierarchy or the first cone being a non-terminal cone of the cone hierarchy;

updating (c) the first visibility distance of the first cone with the bound-cone distance and (d) a nearest object indicator for the first cone with a pointer associated with the first bound in response to (e) the bound-cone distance being smaller than the first visibility distance and (f) the first bound being a terminal bound and the first cone being a terminal cone;

wherein the nearest object indicators of the leaf cones of the cone hierarchy are usable to generate a rendered image on a display device.

* * * * *